US012318715B2

(12) United States Patent
Wells et al.

(10) Patent No.: US 12,318,715 B2
(45) Date of Patent: Jun. 3, 2025

(54) FILTER ELEMENT ENDCAP WITH SHROUD

(71) Applicant: Donaldson Company, Inc., Bloomington, MN (US)

(72) Inventors: Jason A. Wells, Indianapolis, IN (US); Larry Gerken, Bowling Green, OH (US)

(73) Assignee: Donaldson Company, Inc., Bloomington, MN (US)

( * ) Notice: Subject to any disclaimer, the term of this patent is extended or adjusted under 35 U.S.C. 154(b) by 394 days.

(21) Appl. No.: 17/621,491

(22) PCT Filed: Jun. 24, 2020

(86) PCT No.: PCT/US2020/039355
§ 371 (c)(1),
(2) Date: Dec. 21, 2021

(87) PCT Pub. No.: WO2020/263976
PCT Pub. Date: Dec. 30, 2020

(65) Prior Publication Data
US 2022/0347602 A1    Nov. 3, 2022

Related U.S. Application Data

(60) Provisional application No. 62/866,431, filed on Jun. 25, 2019.

(51) Int. Cl.
*B01D 29/23*    (2006.01)
*B01D 29/58*    (2006.01)
(Continued)

(52) U.S. Cl.
CPC ........... *B01D 29/232* (2013.01); *B01D 29/58* (2013.01); *B01D 36/001* (2013.01);
(Continued)

(58) Field of Classification Search
None
See application file for complete search history.

(56) References Cited

U.S. PATENT DOCUMENTS 4,743,371 A       5/1988  Servas et al.
5,575,832 A  *   11/1996  Boyd ................... B01D 53/261
                                                                95/123
(Continued)

FOREIGN PATENT DOCUMENTS

AR       225099 A1    2/1982
CN      1455696 A    11/2003
(Continued)

OTHER PUBLICATIONS

Brochure, "Hydac Filtertechnik; RT Filtertechnik: RT Return Line Filter: The standard product range for optimized air separation", Hydac Filtertechnik GmbH, Sulzbach/Saar, Germany, 12 pages. No date, but believed available as early as Jul. 2019.

(Continued)

*Primary Examiner* — Krishnan S Menon
(74) *Attorney, Agent, or Firm* — Mueting Raasch Group

(57) ABSTRACT

A filter element has a filter media assembly extending between a first end and a second end to define a media length along a longitudinal axis. The filter media assembly defines a central opening on an upstream side and an outer radial boundary on a downstream side. A first endcap is coupled to the first end. The first endcap has a media potting structure defining an annular surface abutting the first end of the filter media assembly, an inner tubular flange extending longitudinally from the annular surface into the central opening, and an outer tubular flange extending longitudinally from the annular surface over the outer radial boundary of the first end of the filter media assembly. The first endcap has an outer circumferential sealing surface about the longitudinal (Continued)

axis and a shroud to obstruct fluid flow extending longitudinally from the outer circumferential sealing surface towards the second end.

19 Claims, 14 Drawing Sheets

(51) Int. Cl.
  *B01D 36/00* (2006.01)
  *B01D 53/04* (2006.01)
  *B01D 53/26* (2006.01)

(52) U.S. Cl.
  CPC ....... *B01D 53/0446* (2013.01); *B01D 53/261* (2013.01); *B01D 2201/295* (2013.01); *B01D 2201/302* (2013.01); *B01D 2201/347* (2013.01); *B01D 2257/80* (2013.01)

(56) References Cited

U.S. PATENT DOCUMENTS

| | | | |
|---|---|---|---|
| 5,951,862 | A | 9/1999 | Bradford |
| 6,217,755 | B1 * | 4/2001 | Stifelman ............ B01D 35/147 210/438 |
| 6,419,718 | B1 | 7/2002 | Klug et al. |
| 6,540,909 | B2 | 4/2003 | Smith et al. |
| 6,610,198 | B1 | 8/2003 | Jiang et al. |
| 6,887,376 | B2 | 5/2005 | Cella et al. |
| 8,991,422 | B2 | 3/2015 | Risatti |
| 2004/0094463 | A1 | 5/2004 | Laverdiere et al. |
| 2005/0103701 | A1 * | 5/2005 | Bechtum ................ B01D 29/15 210/340 |
| 2008/0202992 | A1 | 8/2008 | Bridges et al. |
| 2009/0071111 | A1 | 3/2009 | Lundgren et al. |
| 2010/0155321 | A1 | 6/2010 | Sasur et al. |
| 2011/0132828 | A1 | 6/2011 | Ries et al. |
| 2014/0151386 | A1 | 6/2014 | Alioto et al. |
| 2015/0165344 | A1 | 6/2015 | Kocksch |
| 2016/0074799 | A1 | 3/2016 | Wall |
| 2019/0329170 | A1 | 10/2019 | Page et al. |

FOREIGN PATENT DOCUMENTS

| | | | |
|---|---|---|---|
| CN | 200963548 | Y | 10/2007 |
| CN | 102264446 | A | 11/2011 |
| CN | 104582811 | A | 4/2015 |
| CN | 105413322 | A | 3/2016 |
| CN | 109890666 | A | 6/2019 |
| DE | 102004054725 | | 5/2006 |
| EP | 0773053 | B1 * | 2/2003 |
| GB | 2389323 | | 12/2003 |
| WO | 02/31340 | | 4/2002 |
| WO | 0234352 | A1 | 5/2002 |

OTHER PUBLICATIONS

Data Information Sheet, "T.R.A.P. TM Breather Technology For Hydraulic And Lube Oil Reservoirs", Donaldson Filtration Solutions, Donaldson Company, Inc., Minneapolis, Minnesota, 2015, 6 pages.
International Patent Application No. PCT/US2020/039355, filed Jun. 24, 2020; PCT Invitation to Pay Additional Fees and Partial Search Report, issued Sep. 23, 2020, 7 pages.
International Patent Application No. PCT/US2020/039355, filed Jun. 24, 2020; PCT International Search Report and Written Opinion, issued Nov. 13, 2020, 14 pages.
International Patent Application No. PCT/US2020/039355, filed Jun. 24, 2020; PCT International Preliminary Report on Patentability, issued Dec. 28, 2021, 8 pages.
Screen captures from YouTube clip entitled "Fuel Pro Seeing is Believing Technology and Filter Change", uploaded on Nov. 17, 2014 by user "Fleetguard" Retrieved from the internet: https://www.youtube.com/watch?v=-wx_iN3W2Jk; 2 pages.
U.S. Appl. No. 62/798,272, first-named inventor Michael J. Gustafson, entitled "System and Method for Deaeration", filed Jan. 29, 2019, 38 pages. (provided as application is accessible in USPTO Patent Center system.).

* cited by examiner

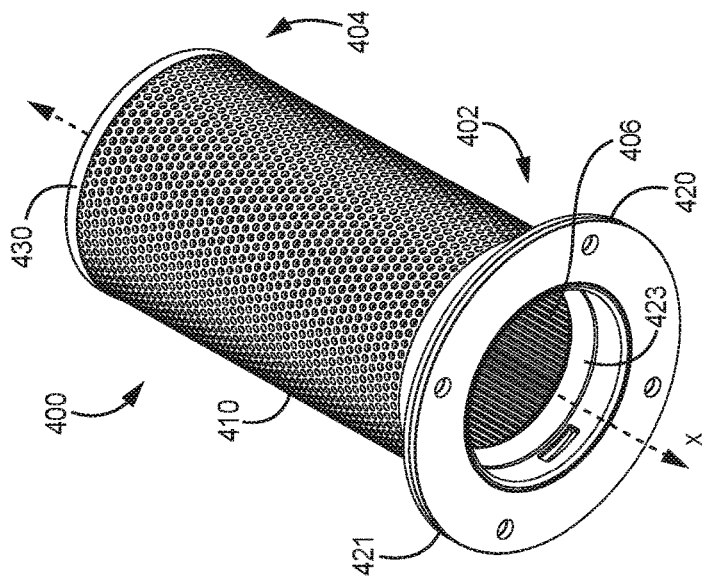
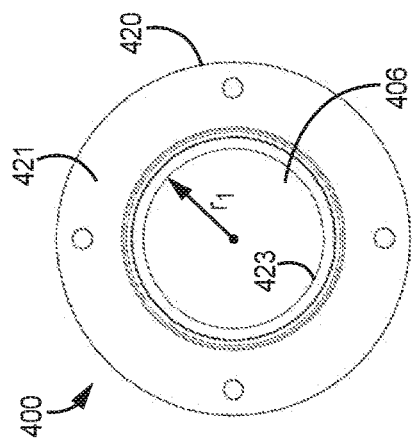
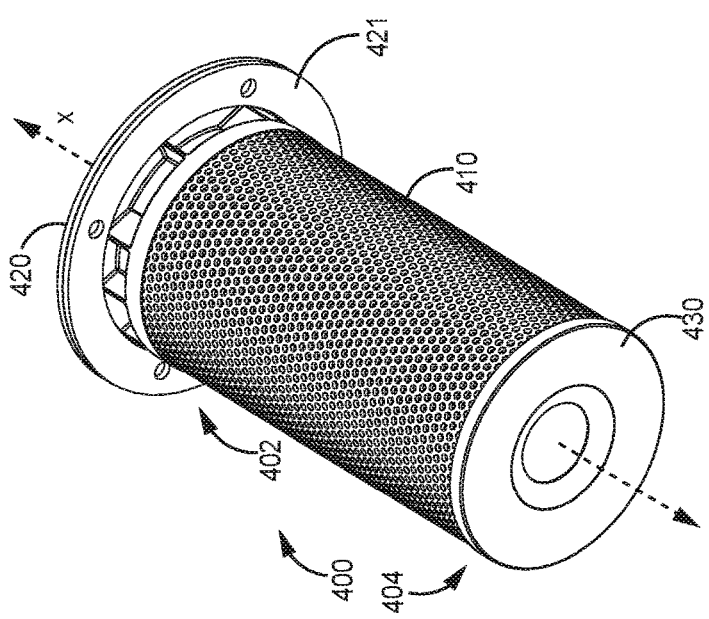

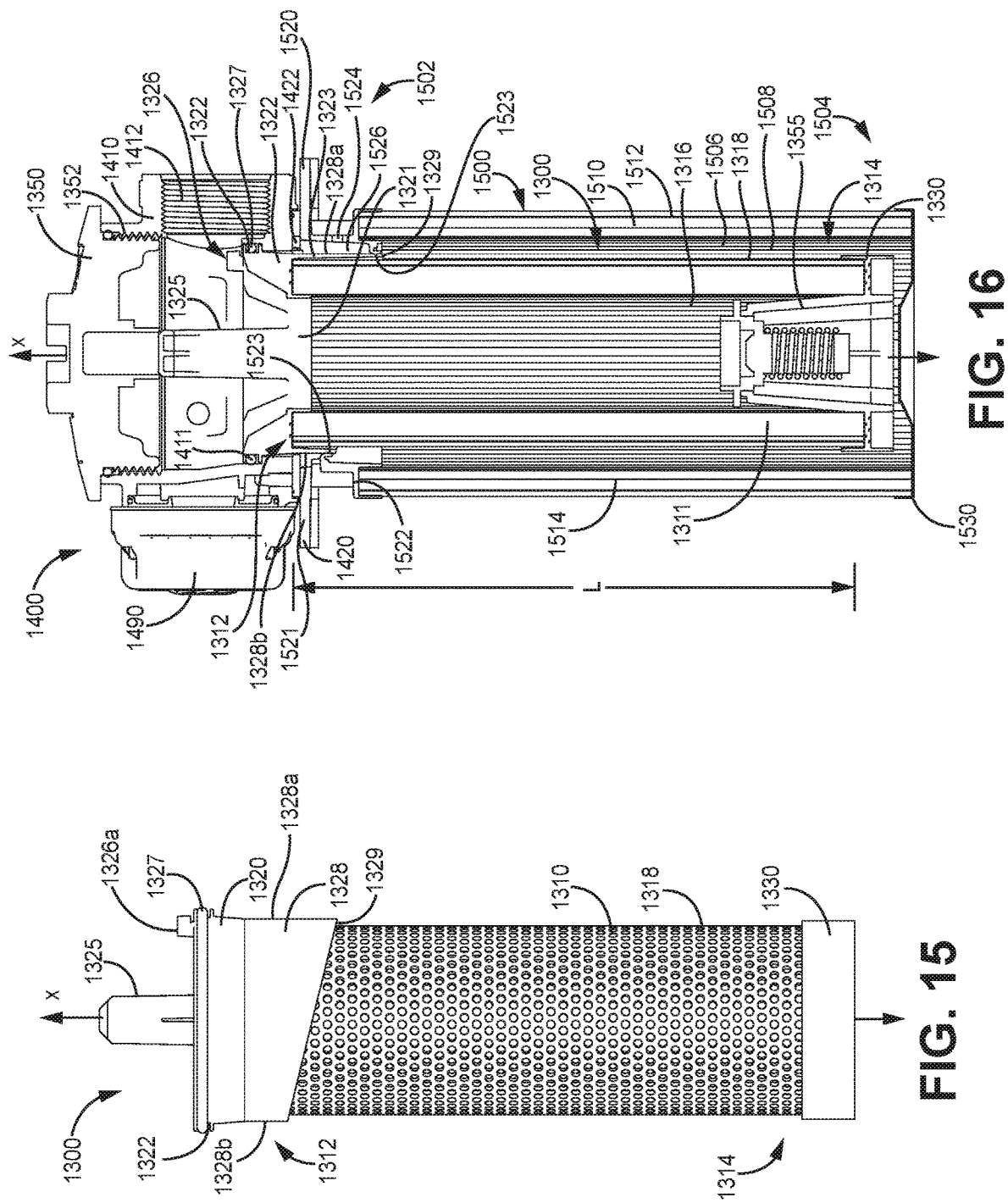

FILTER ELEMENT ENDCAP WITH SHROUD

This application is the § 371 U.S. National Stage of International Application No. PCT/US2020/039355, filed 24 Jun. 2020, which claims the benefit of U.S. Provisional Application No. 62/866,431, filed 25 Jun. 2019, the disclosures of which are incorporated by reference herein in their entireties.

FIELD OF THE TECHNOLOGY

The technology disclosed herein generally relates to filter element endcaps. More particularly, the technology disclosed herein relates to filter element endcaps with a shroud.

SUMMARY

Some examples of the technology disclosed herein relate to a filter element having a filter media assembly extending between a first end and a second end to define a media length along a longitudinal axis. The filter media assembly defines a central opening on an upstream side and an outer radial boundary about the longitudinal axis on a downstream side. A first endcap is coupled to the first end. The first endcap has a media potting structure defining an annular surface abutting the first end of the filter media assembly, an inner tubular flange extending longitudinally from the annular surface into the central opening, and an outer tubular flange extending longitudinally from the annular surface over the outer radial boundary of the first end of the filter media assembly. The outer flange also has an outer circumferential sealing surface about the longitudinal axis and a shroud extending longitudinally from the outer circumferential sealing surface towards the second end, where the shroud is configured to obstruct fluid flow.

In such some embodiments, the shroud surrounds the outer radial boundary of the filter media assembly. Additionally or alternatively, the shroud has a length that is no more than ¼ of the media length. Additionally or alternatively, the shroud has a length that varies about the outer radial boundary of the filter media assembly Additionally or alternatively, a substantial portion of the shroud is between the outer circumferential sealing surface and the media potting structure. Additionally or alternatively, the minimum radial distance between the outer radial boundary and the shroud is at least 1 mm. Additionally or alternatively, the shroud has a length greater than or equal to 1 inch. Additionally or alternatively, the shroud extends longitudinally from the media potting structure towards the second end of the filter media assembly.

Additionally or alternatively, the outer circumferential sealing surface is between the media potting structure and a terminal end of the shroud. Additionally or alternatively, the shroud extends circumferentially about the longitudinal axis. Additionally or alternatively, a portion of the media potting structure defines a portion of the shroud. Additionally or alternatively, the filter element has a breather filter housing coupled to the first endcap and a filter cover coupled to the first endcap, where the breather filter housing and the filter cover mutually define a breather filter cavity. In some such embodiments, a breather filter is disposed in the breather filter cavity, where the breather filter defines a first flow face and a second flow face, the first endcap defines a first tortuous airflow pathway between an ambient environment and the first flow face, and the filter cover defines a second tortuous airflow pathway between the ambient environment and the second flow face. In some such embodiments, the filter cover defines a fill port that is central to the filter cover.

Additionally or alternatively, the fill port extends in a longitudinal direction. Additionally or alternatively, the breather filter has a desiccant. Additionally or alternatively, the breather filter has a regenerative hygroscopic filter. Additionally or alternatively, the breather filter housing has a main portion and an airflow channel plate, where the main portion and the airflow channel plate mutually define the first tortuous airflow pathway. Additionally or alternatively, the filter element has a plurality of spacers extending between the first endcap and the breather filter housing. Additionally or alternatively, the second flow face of the breather filter is an outer radial flow face and the first flow face of the breather filter is an inner radial flow face, and the breather filter and the filter media assembly share a central axis. Additionally or alternatively, the filter media assembly has filter media that is pleated.

Some embodiments of the technology disclosed herein relate to a filtration system having a filter element and a separator assembly. The filter element has a filter media assembly extending between a first end and a second end to define a media length along a longitudinal axis, where the filter media assembly defines a central opening on an upstream side and an outer radial boundary about the longitudinal axis on a downstream side. A first endcap is coupled to the first end, where the first endcap has a media potting structure defining an annular surface abutting the first end of the filter media assembly, an inner tubular flange extending longitudinally from the annular surface into the central opening, and an outer tubular flange extending longitudinally from the annular surface over the outer radial boundary of the filter media assembly. A shroud extends longitudinally from the media potting structure, where the shroud defines a terminal end between the first end of the filter media assembly and the second end of the filter media assembly. A separator assembly defining a cavity, where the separator assembly has a first separator endcap having a radial rim on one longitudinal end and a radial separator potting structure on an opposite longitudinal end. The first separator endcap defines an inner circumferential seal surface and an air channel opening between the radial rim and the radial separator potting structure relative to a longitudinal direction. The inner circumferential seal surface has a radius that is less than a radius of an outer surface of a corresponding portion of the shroud such that the first separator endcap and the corresponding portion of the shroud are configured to form a seal. Separator material extends from the radial separator potting structure along the longitudinal axis, where the cavity is configured to substantially receive the filter element.

In some such examples, the separator material has pleated wire mesh. Additionally or alternatively, the separator material has a stainless steel wire mesh. Additionally or alternatively, the wire of the wire mesh defines openings having a width of about 50 microns. Additionally or alternatively, the separator material has a first layer of wire mesh and a second layer of wire mesh. Additionally or alternatively, the separator material has at least one material in the group consisting of: micro-glass, cellulose, and a polymer. Additionally or alternatively, the first endcap defining an outer circumferential sealing surface about the longitudinal axis.

Additionally or alternatively, the shroud surrounds the outer radial boundary of the filter media assembly. Additionally or alternatively, the shroud has a length that is no more than ¼ of the media length. Additionally or alternatively, the shroud has a length that varies about the outer radial boundary of the filter media assembly. Additionally or alternatively, the first endcap defines an outer circumferential sealing surface and a substantial portion of the shroud is between the outer circumferential sealing surface and the media potting structure. Additionally or alternatively, the minimum radial distance between the outer radial boundary and the shroud is at least 1 mm. Additionally or alternatively, the shroud has a length greater than or equal to 1 inch. Additionally or alternatively, the shroud extends longitudinally from the media potting structure towards the second end of the filter media assembly.

Additionally or alternatively, the first endcap defines an outer circumferential sealing surface, and the outer circumferential sealing surface is between the media potting structure and a terminal end of the shroud. Additionally or alternatively, a portion of the media potting structure defines a portion of the shroud. Additionally or alternatively, the filter element further has a breather filter housing coupled to the first endcap, a filter cover coupled to the first endcap, wherein the breather filter housing and the filter cover mutually define a breather filter cavity, and a breather filter disposed in the breather filter cavity, where the breather filter defines a first flow face and a second flow face. In some such embodiments the first endcap defines a first tortuous airflow pathway between an ambient environment and the first flow face, and the filter cover defines a second tortuous airflow pathway between the ambient environment and the second flow face.

Additionally or alternatively, the filter cover defines a fill port that is central to the filter cover. Additionally or alternatively, the fill port extends in a longitudinal direction. Additionally or alternatively, the breather filter has a desiccant. Additionally or alternatively, the breather filter has a regenerative hygroscopic filter. Additionally or alternatively, the breather filter housing has a main portion and an airflow channel plate, wherein the main portion and the airflow channel plate mutually define the first tortuous airflow pathway. Additionally or alternatively, the system has a plurality of spacers extending between the first endcap and the breather filter housing. Additionally or alternatively, the second flow face of the breather filter is an outer radial flow face and the first flow face of the breather filter is an inner radial flow face and where the breather filter and the filter media assembly share a central axis. Additionally or alternatively, the filter media assembly has filter media that is pleated.

Some embodiments of the currently-described technology relate to a filtration system having a fluid tank defining an opening, a filter element at least partially disposed in the fluid tank through the opening, a filter head coupled to the fluid tank and the first endcap, and a filter cover coupled to the filter head. The filter element defines a central opening and has a first endcap and a filter media assembly extending longitudinally from the first endcap to a second end. The first endcap has a shroud extending longitudinally from the first endcap over an outer radial boundary of the filter media assembly. The filter head defines one or more conduits in fluid communication with the central opening of the filter element, and the filtration system is configured to cumulatively define an airflow pathway extending from a terminus to an ambient environment, where the terminus is in direct fluid communication with an interior of the fluid tank, at least a portion of the shroud is configured to be positioned between the terminus and the filter media assembly, and where the shroud extends from the terminus towards the second end of the filter media assembly.

In some such embodiments, the system has a breather filter disposed in the airflow pathway. Additionally or alternatively, the first endcap has an outer circumferential sealing surface and a media potting structure, and a substantial portion of the shroud extends between the outer circumferential sealing surface and the media potting structure. Additionally or alternatively, the shroud has a length in the longitudinal direction of at least one inch. Additionally or alternatively, the filter media assembly has a media length and the shroud has a length that is no more than ¼ of the media length. Additionally or alternatively, the shroud has a length that varies about the outer radial boundary of the filter media assembly.

Additionally or alternatively, the minimum radial distance between the outer radial boundary and the shroud is at least 1 mm. Additionally or alternatively, the shroud has a length greater than or equal to 1 inch. Additionally or alternatively, the first endcap has an outer circumferential sealing surface and a media potting structure, where the outer circumferential sealing surface is between the media potting structure and a terminal end of the shroud. Additionally or alternatively, the shroud extends circumferentially about a longitudinal axis. Additionally or alternatively, the first endcap has a media potting structure, where a portion of the media potting structure defines a portion of the shroud.

Additionally or alternatively, the system has a separator assembly defining a cavity, where the separator assembly has a first separator endcap having a radial separator potting structure and separator material extending from the radial separator potting structure along a longitudinal axis, where the cavity is configured to substantially receive the filter element. Additionally or alternatively, the first separator endcap has a radial rim on one longitudinal end and the radial separator potting structure on an opposite longitudinal end, where the first separator endcap defines an inner circumferential seal surface and an air channel opening between the radial rim and the radial separator potting structure relative to a longitudinal direction. In such embodiments the inner circumferential seal surface has a radius that is less than a radius of an outer surface of a corresponding portion of the shroud such that the first separator endcap and the corresponding portion of the shroud are configured to form a seal.

BRIEF DESCRIPTION OF THE DRAWINGS

FIG. 6a is a first perspective view of an example separator assembly.

FIG. 6b is a second perspective view of the example separator assembly of FIG. 6a.

FIG. 6c is a facing view of the example separator assembly of FIG. 6a.

FIG. 15 is a facing view of yet another example filter element consistent with the current technology.

FIG. 16 is a partial cross-sectional view of another example system consistent with some examples.

The current technology can be more completely understood and appreciated in consideration of the following detailed description of various embodiments of the current technology in connection with the accompanying drawings.

DETAILED DESCRIPTION

The technology disclosed herein generally relates to a liquid filter element that is configured to be in communication with an airflow pathway. Filter elements consistent with the current technology can be used in hydraulic filtration systems, for example. In the normal use of a hydraulic system, hydraulic fluid is rapidly depleted and added to the fluid reservoir, necessitating corresponding airflow into and out of the reservoir. It can be desirable to limit the moisture and debris that enters into the system from the ambient environment. Further, it can be desirable to prevent fluid from entering the airflow pathway.

Figure 1:
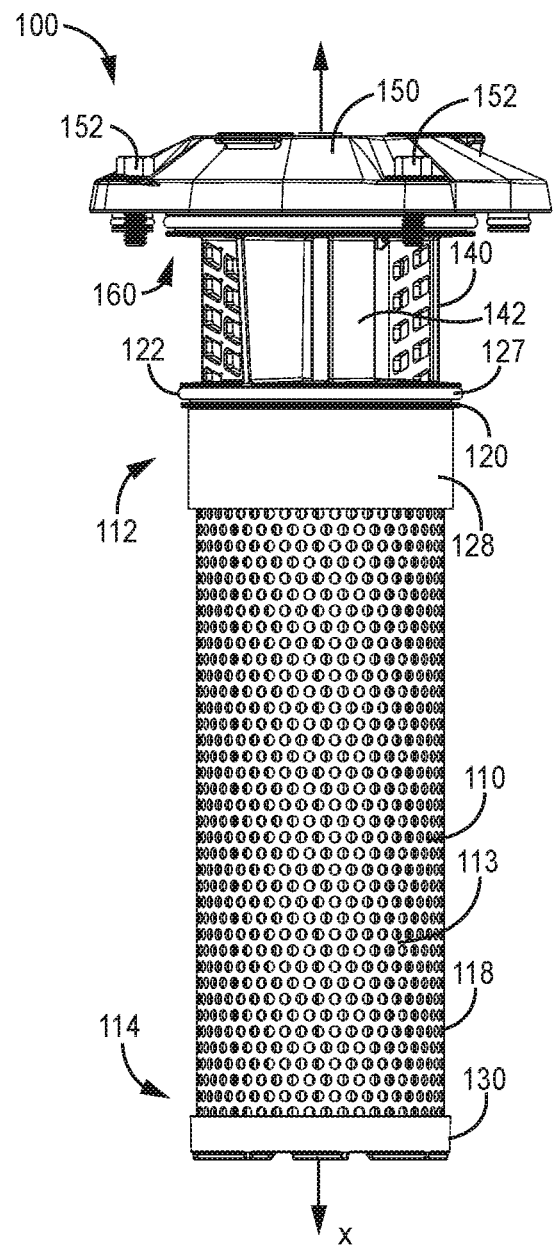
FIG. 1 is a facing view of an example filter element consistent with the technology disclosed herein.
Figure 2:
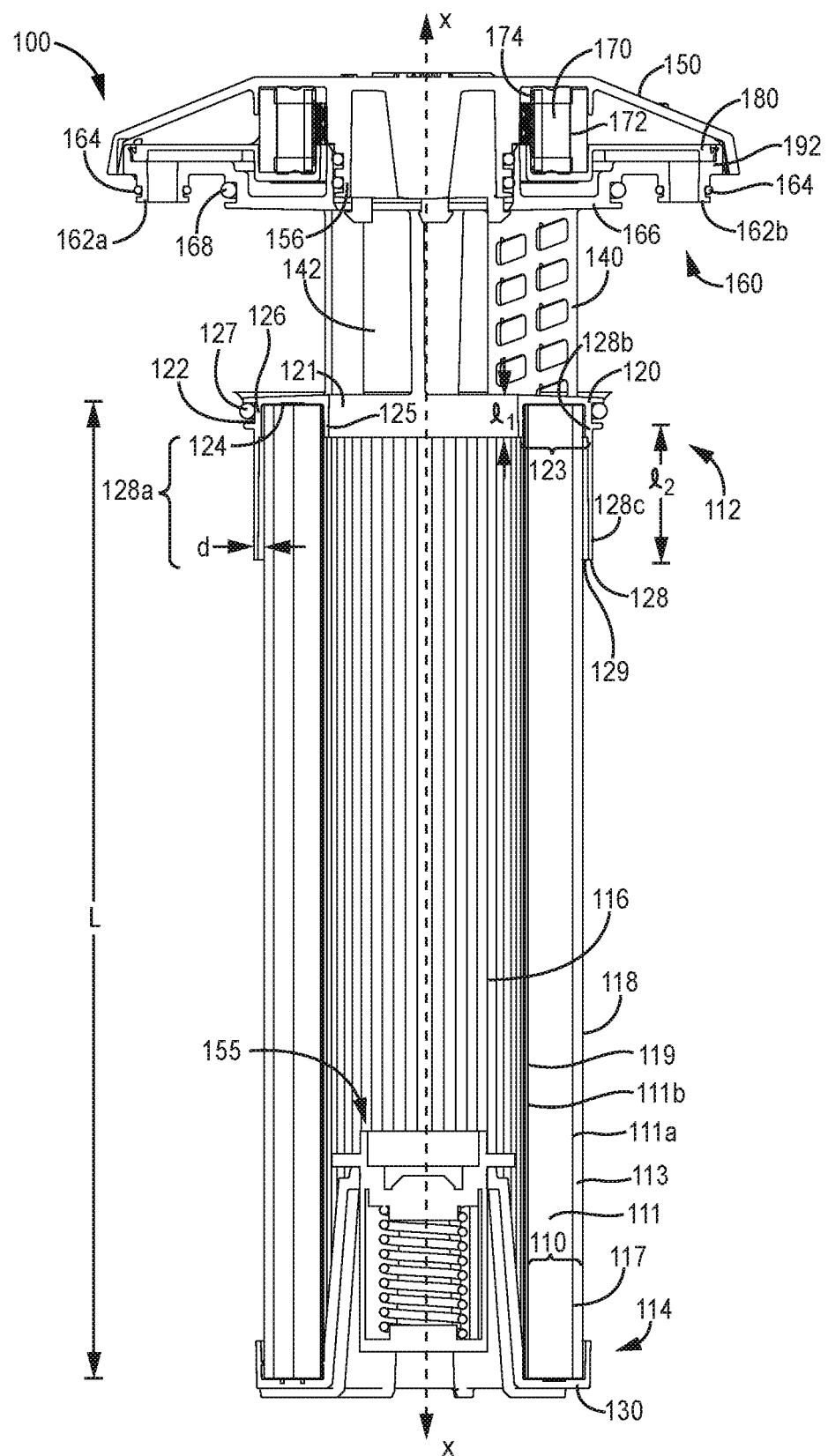
FIG. 2 is a cross-sectional view of an example filter element consistent with FIG. 1.

FIG. 1 is a facing view of an example filter element 100 consistent with the technology disclosed herein, and FIG. 2 is a cross-sectional view of an example filter element 100 consistent with FIG. 1. The filter element 100 has filter media assembly 110 extending between a first end 112 and a second end 114 to define a media length L along a longitudinal axis x. The filter media assembly 110 defines a central opening 116 on an upstream side and an outer radial boundary 118 (particularly visible in FIG. 2) along the longitudinal axis x on a downstream side. A first endcap 120 is coupled to the first end 112 of the filter media assembly 110 and a second endcap 130 is coupled to the second end 114 of the filter media assembly 110 such that the filter media assembly 110 extends between the first endcap 120 and the second endcap 130 in the longitudinal direction. The first endcap 120 has an outer circumferential sealing surface 122 about the longitudinal axis x and a shroud 128 that extends longitudinally from the outer circumferential sealing surface 122 towards the second end 114 of the filter media assembly 110.

The filter media assembly 110 is generally configured to filter a fluid. In some embodiments the filter media assembly 110 is configured to filter hydraulic fluid. The first end 112 of the filter media assembly 110 is coupled to the first endcap 120 and the second end 114 of the filter media assembly 110 is coupled to a second endcap 130. The filter media assembly 110 generally has a cylindrical arrangement and defines the central opening 116 extending from the first end 112 to the second end 114. The filter media assembly 110 and the central opening 116 share a central axis x. The length L of the filter media assembly 110 can vary. In some embodiments the length L of the filter media assembly 110 is greater than 3.5 inches (8.9 cm). In some embodiments the length L of the filter media assembly 110 is less than 40 inches (101.6 cm). In some embodiments the length L of the filter media assembly 110 ranges from about 4-40 inches (10.2-101.6 cm), 15-30 inches (38.1-76.2 cm), or 10-25 inches (25.4-63.5 cm).

The filter media assembly 110 can have one or more layers of filter media 111 and one or more structural supports 113 abutting the filter media 111. The structural support 113 generally does not exhibit a filtration efficiency and is highly permeable. Here the structural support 113 is a tubular screen surrounding the outer boundary of the filter media 111, but in some embodiments the structural support(s) 113 is omitted. In some embodiments, a structural support abuts an inner boundary of the filter media 111 within the central opening 116. In some embodiments, a structural support abuts the filter media 111 along the inner boundary and the outer boundary of the filter media 111. The structural support 113 is generally configured to provide structural support to the filter media 111 to prevent collapse of the filter media 111 when subjected to forces resulting from liquid flow therethrough.

The filter media 111 can be constructed of a variety of materials and combinations of materials. In some embodiments the filter media 111 is constructed of fibers. The filter media 111 is pleated in various embodiments. In some other embodiments, the filter media is a sheet of media wrapped in a spiraled configuration about the longitudinal axis. In some embodiments where the filter media 111 is pleated, the filter media 111 is a sheet of media that has a first set of pleat folds 117 cumulatively defining an outer circumferential limit 111*a* (FIG. 2) of the filter media 111 and a second set of pleat folds 119 cumulatively defining an inner circumferential limit 111*b* of the filter media 111. In the current example, the inner circumferential limit 111*b* of the filter media 111 is an inner radial boundary 119 (which is also the pleat folds 119) of the filter media assembly 110. But in some embodiments described above where a structural support can abut the filter media 111 along its inner boundary, such a structural support would define the inner radial boundary of the filter media assembly 110. Indeed, in the current embodiment where a structural support 113 surrounds the filter media 111, the structural support 113 defines an outer radial boundary 118 of the filter media assembly 110.

The first endcap 120 and second endcap 130 are generally configured to retain the ends of the filter media assembly 110 and create a portion of a fluid flow pathway through the filter media assembly 110. In the current example, the first endcap 120 defines an endcap opening 121 that is in communication with the central opening 116 of the filter media assembly 110. As is best visible in FIG. 2, the first endcap 120 has a media potting structure 123 that is configured to receive the first end 112 of the filter media assembly 110. The media potting structure 123 defines an annular surface 124 abutting the first end 112 of the filter media assembly 110, an inner tubular flange 125, and an outer tubular flange 126. The inner tubular flange 125 extends longitudinally from the annular surface 124 into the central opening 116. The inner tubular flange 125 has a length h. The outer tubular flange 126 extends longitudinally from the annular surface 124 over the outer radial boundary 118 of the first end 112 of the filter media assembly 110. In various embodiments, the media potting structure 123 and the first end 112 of the filter media assembly 110 are bonded with an adhesive/sealant that is disposed in the media potting structure 123.

The first endcap 120 has an outer circumferential sealing surface 122 about the longitudinal axis x that is configured to form a seal with filtration system components, which will be described in more detail, below. The outer circumferential sealing surface 122 shares the central axis x of the filter media assembly 110 and central opening 116. The outer circumferential sealing surface 122 can be a circumferential cavity that is configured to receive an elastomeric component, such as an o-ring 127. In some embodiments the circumferential cavity is discontinuous, while in other embodiments the circumferential cavity is continuous.

The shroud 128 is generally configured to obstruct fluid flow. In various embodiments, the shroud 128 is configured to obstruct fluid flow radially outward from at least a portion of the outer radial boundary 118 of the filter media assembly 110. The shroud 128 can be constructed of a variety of types of materials and combinations of materials. In some embodiments, such as the one currently depicted, the shroud 128 extends circumferentially about the longitudinal axis x. Indeed, the shroud 128 surrounds the outer radial boundary 118 of the filter media assembly 110. The shroud 128 can surround the entire outer radial boundary 118 of the filter media assembly 110. In some alternate embodiments, which will be described in more detail below, the shroud 128 extends over less than the entire outer radial boundary 118 of the filter media assembly 110.

The shroud 128 has a length 12 that is defined from the outer circumferential sealing surface 122 to a terminal end 129 of the shroud 128, where the terminal end 129 of the shroud 128 is the end of the shroud 128 closest to the second end 114 of the filter media assembly 110. In some embodiments, the shroud 128 is generally no more than ¼ of the length L of the filter media assembly 110. In some embodiments, the shroud 128 is greater than or equal to one inch (2.56 cm) in length.

In various embodiments, such as the one depicted, the media potting structure 123 or, particularly, the outer tubular flange 126 and the shroud 128 overlap. That is to say, at least a portion of the media potting structure 123 defines a portion of the shroud 128. In examples consistent with the currently-described figures, the shroud 128 extends longitudinally from the media potting structure 123 towards the second end 114 of the filter media assembly 110.

In some embodiments, at least a portion of the shroud 128 is spaced from the outer radial boundary 118 of the filter media assembly 110 by a radial distance d, such as the portion of the shroud 128a that (1) does not form a portion of the media potting structure 123 and (2) surrounds the outer radial boundary 118 of the filter media. In some other embodiments, a portion of the shroud 128 abuts the outer radial boundary 118 of the filter media assembly 110, such as the portion of the shroud 128b that forms a portion of the media potting structure 123. In some embodiments the shroud 128 can taper outwardly from the outer radial boundary of 118 the filter media assembly 110 from the first end 112 towards the second end 114. In some examples consistent with the currently-depicted embodiment, the radial distance d between the outer radial boundary 118 and the non-potting structure portion of the shroud 128a is at least 0.5 mm. In some examples consistent with the currently-depicted embodiment, the radial distance d between the outer radial boundary 118 and the non-potting structure portion of the shroud 128a ranges from 0 mm-4 mm or 0.5-1 mm.

In various examples consistent with the currently described figures, a spacer 140 extends between the first endcap 120 and a sealing surface 160. A filter cover 150 is coupled to the first endcap 120. In various embodiments, the spacer 140 is coupled to the first endcap 120. The spacer 140 generally extends away from the filter media assembly 110 in the longitudinal direction. The spacer 140 defines an open volume 142 adjacent to the endcap opening 121 of the first endcap 120. The open volume 142 is a portion of a fluid flow pathway defined through the filter element 100. In some embodiments, such as the one depicted, a plurality of spacers 140 are coupled to the first endcap 120, and the plurality of spacers 140 mutually define the open volume 142 that is a portion of the fluid flow pathway through the filter element 100.

The filter cover 150 of the filter element 100 is generally configured to fix the filter element 100 to a filtration system (not shown). In particular, the filter cover 150 is generally configured to be secured to a filter head of the filtration system. The filter cover 150 has one or more coupling elements 152 that are configured to be secured to the filter head. The one or more coupling elements 152 can be bolts, screws, a clamp(s), and the like. In some embodiments, the one or more coupling elements 152 can have a bayonet connector.

The sealing surface 160 of the filter element 100 is configured to create a fluid seal with filtration system components. In particular, the sealing surface 160 is generally configured to create a fluid seal with a filter head when the filter cover 150 is secured to the filter head. The sealing surface is coupled to the spacer 140. The sealing surface 160 can have a variety of configurations, but in the current example, the sealing surface 160 defines protrusions 162, 166 extending towards the first end 112 of the filter media assembly 110. The protrusions 162, 166 are configured to be sealably received by mating features of a filter head. In particular, each of the protrusions 162, 166 have a seal 164, 168 disposed thereon. The seals 164, 168 can be a variety of types of seals, but in the current embodiments the seals 164, 168 are each outer radial seals disposed about the protrusions 162, 166. In some embodiments the seals can be axial seals.

In the current example, the protrusions have a main protrusion 166, a first secondary protrusion 162a, and a second secondary protrusion 162b. The main protrusion 166 can generally be larger than the secondary protrusions 162, in some embodiments. For example, the main protrusion 166 can have a first perimeter length that is at least 3, 5 or 7 times the perimeter length of each of the first and second secondary protrusions 162. Each of the perimeter lengths can be measured at the widest portion of the particular protrusion around the protrusion. The main protrusion 166 is central to the secondary protrusions 162. In various embodiments, the first secondary protrusion 162a is positioned 140°-220°, 160°-200°, or 170°-190° from the second secondary protrusion 162b relative to the central axis x. In the current example, the first secondary protrusion 162a is 179°-181°, and in particular, 180° from the second secondary protrusion 162b relative to the central axis x.

The seal disposed about the main protrusion 166 can be referred to as a main seal 168, and the seal disposed about the secondary protrusions 162 can be referred to as secondary seals 164. The main seal 168 is central to the secondary seals 164 in the current example. The secondary seals are positioned 140°-220°, 160°-200°, or 170°-190° from each other relative to the central axis x. In particular, the secondary seals are positioned about 180° from each other relative to the central axis x.

As is visible in FIG. 2, the filter element 100 incorporates a bypass assembly 155 that is configured to route fluid along a flow path that bypasses the filter media 111 (such as through the second endcap 130) when the fluid reaches a particular minimum pressure. The bypass assembly 155 can have a variety of different constructions and configurations that will generally be understood. In some embodiments a bypass assembly 155 can be omitted.

Figure 3A:
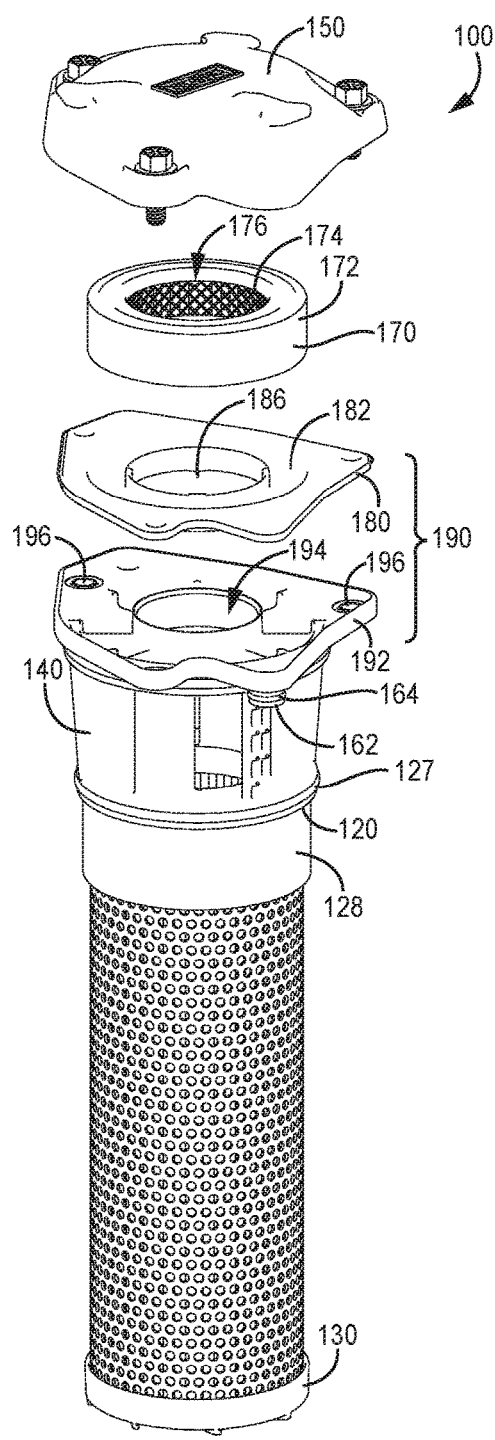
FIG. 3a is an exploded perspective view of an example filter element consistent with FIGS. 1 and 2.
Figure 3B:
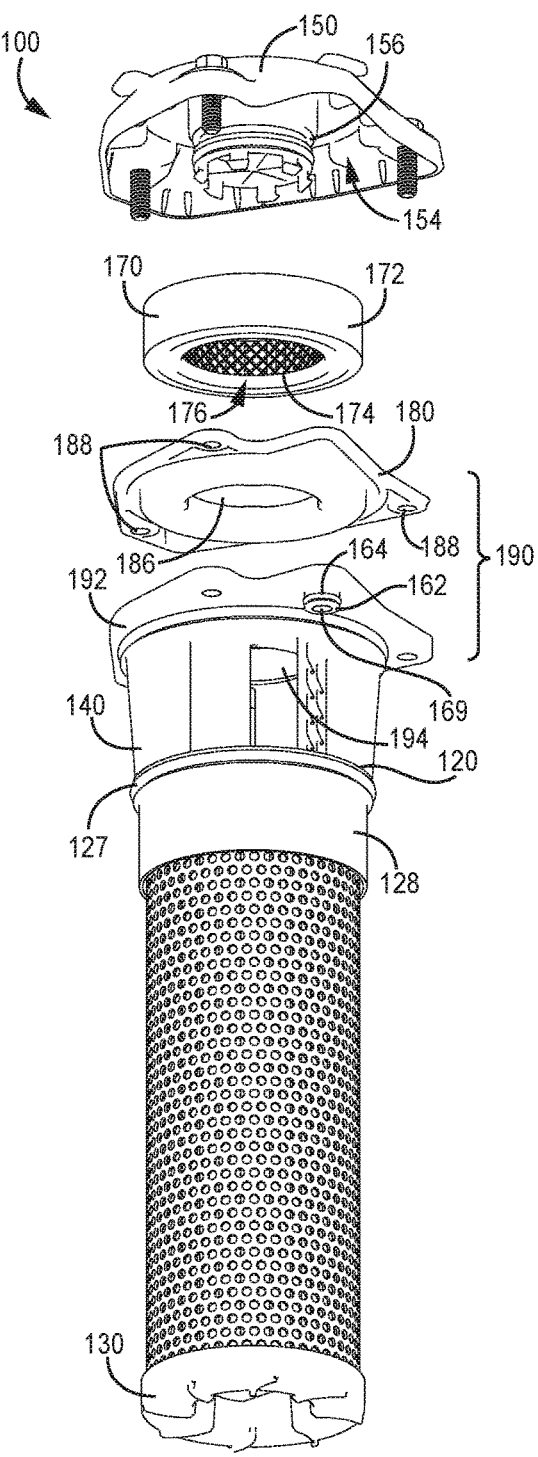
FIG. 3b is second exploded perspective view of an example filter element consistent with FIGS. 1 and 2.

FIG. 3a is a first perspective exploded view of a filter element 100 consistent with FIG. 2, and FIG. 3b is a second perspective exploded view of a filter element 100 consistent with FIG. 2. FIGS. 3a and 3b can be viewed in conjunction with FIGS. 1 and 2 for the following description. The filter element 100 has generally been described above, but additional components of the filter element 100 are more clearly visible. In particular, a breather filter 170 is integral to the filter cover 150.

The breather filter 170 is generally configured to filter gaseous fluid passing between the ambient environment and the filter element 100. In some embodiments the breather filter 170 is configured to prevent moisture in the ambient environment from passing into the filter element 100. In some embodiments the breather filter 170 has a desiccant. In some embodiments the breather filter 170 is a regenerative hygroscopic filter. As an example, the breather filter 170 can be a T.R.A.P. breather filter manufactured by Donaldson Corporation headquartered in Bloomington, Minnesota. Other types of breather filters 170 are also contemplated.

The breather filter 170 defines a first flow face 172 and a second flow face 174. In examples, the first flow face 172 is an outer radial flow face and the second flow face 174 is an inner radial flow face, and the breather filter 170 defines a central opening 176, although other configurations are possible. In a variety of implementations, the first flow face 172 and the second flow face 174 each operate as both an upstream flow face and a downstream flow face, depending on whether gaseous fluid is entering or exiting the filter element 100. The filter element 100 generally defines an airflow pathway from the ambient environment through the first flow face 172 and the second flow face 174 of the filter element 100. The breather filter 170 shares the central axis x with the filter media assembly 110.

The breather filter 170 is disposed in a breather filter cavity 154, 182 that is mutually defined by the filter cover 150 and a breather filter housing 190. The filter cover 150 defines a first portion 154 of the breather filter cavity 154, 182 and the breather filter housing 190 defines a second portion 182 of the breather filter cavity. The filter cover 150 defines an extension portion 156 that extends through the central opening 176 of the breather filter 170 towards the first end 112 of the filter media assembly 110.

The breather filter housing 190 is coupled to the filter cover 150 and the first endcap 120. In particular, the spacers 140 extend between and are coupled to the first endcap 120 and the breather filter housing 190. The breather filter housing 190 generally defines the sealing surface 160. In examples consistent with the current embodiment, the breather filter housing 190 has a main portion 192, which defines the sealing surface 160, and an airflow channel plate 180. The main portion 192 and the airflow channel plate 180 are generally fixed together. In particular, the main portion 192 defines first mating features 196 and the airflow channel plate 180 defines second mating features 188, where the first and second mating features are configured to be engaged by corresponding coupling elements 152 of the filter cover 150. The main portion 192 and the airflow channel plate 180 mutually define a tortuous airflow pathway extending from the ambient environment to a flow face of the breather filter 170.

The airflow channel plate 180 defines a central opening 186 and the main portion 192 of the breather filter housing 190 defines a central opening 194 that are each in communication with the central opening of the breather filter 170, the open volume 142 defined by the spacers 140, and the central opening 116 of the filter media assembly 110.

The secondary seals 164 on the secondary protrusions 162 of the sealing surface 160 surround a first end 169 of an airflow pathway defined by the breather filter housing 190, which will be described in more detail below. The airflow channel plate 180 is configured to nest within the main portion 192 of the breather filter housing 190 to define a portion of the airflow pathway therebetween.

In examples consistent with the current embodiment, the first endcap 120, the spacers 140, and the main portion 192 of the breather filter housing 190 are a cohesive component. However, in some other embodiments, the first endcap 120, the spacers 140, and the main portion 192 of the breather filter housing 190 can be separate components that are coupled through various fastening structures. Also, while the main portion 192 of the breather filter housing 190 and the airflow channel plate 180 are separate components that are coupled together, in some embodiments the main portion 192 and the airflow channel plate 180 are a single, cohesive component.

Figure 7:
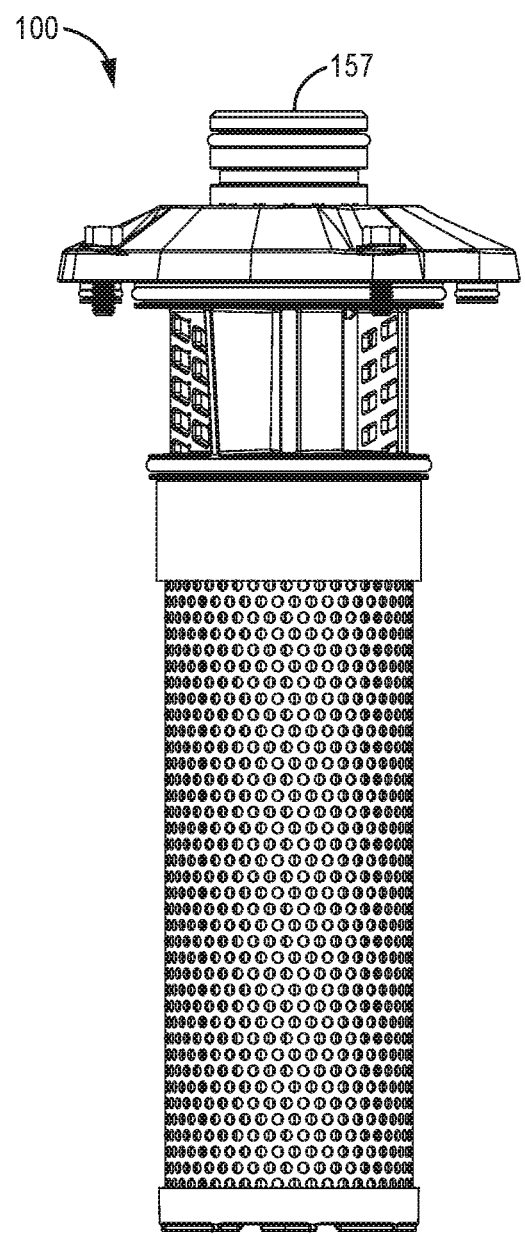
FIG. 7 is a facing view of another example filter element consistent with the technology disclosed herein.

It is noted that in some embodiments the filter cover can incorporate a fill port 157, such as depicted in FIG. 7. The fill port 157 can be configured to direct fluid flow into the filter element 100. For example, in hydraulic systems, the fill port 157 can be configured to receive hydraulic fluid. The fill port 157 can be defined by a tubular structure extending in the longitudinal direction. The fill port 157 can be defined centrally to the filter cover, in some embodiments. The fill port 157 can share the longitudinal axis x with the filter media. In such embodiments, the fill port 157 can be defined within the central opening 176 of the breather filter (see discussion of FIG. 2, above).

Figure 4:
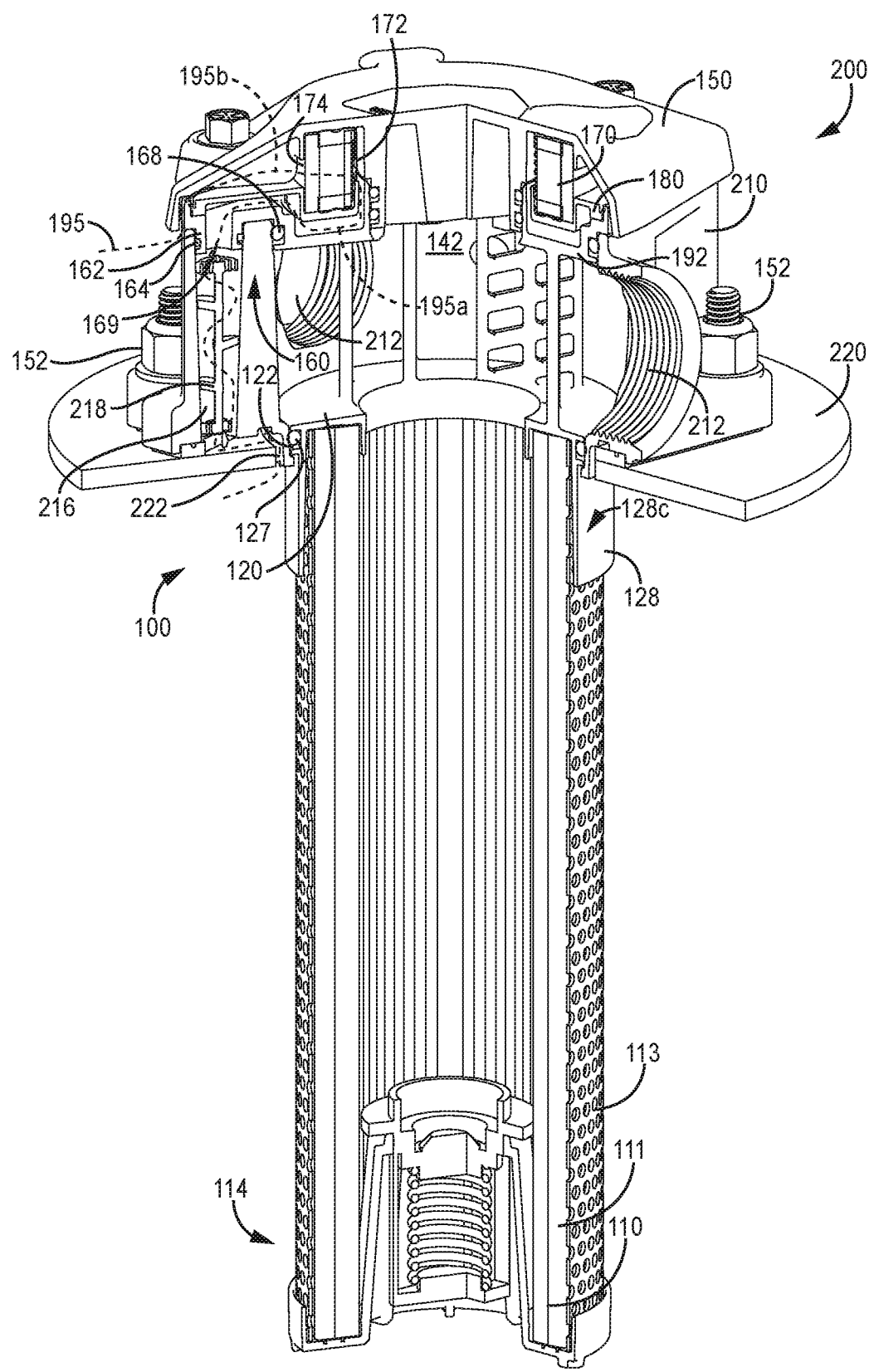
FIG. 4 is a partial cross-section of a perspective view of an example system consistent with the technology disclosed herein.

FIG. 4 is a partial cross-section of a perspective view of an example implementation of a filter element 100 consistent with FIGS. 1-3b. The filter element 100 is installed in a filtration system 200. In particular, the filter media assembly 110 of the filter element 100 is disposed within a fluid tank 220 (only a portion of which is depicted for clarity), and the filter cover 150 is coupled to a filter head 210 via the coupling elements 152. The seals 164, 168 that are disposed on the respective protrusions 162, 166 of the sealing surface 160 (FIG. 2) each forms a seal with a corresponding structure of the filter head 210. Similarly, the outer circumferential seal 127 disposed about the first endcap 120 forms a seal with a corresponding structure of the filter head 210. The corresponding structures of the filter head are inner radial surfaces, in the current example. Conduits 212 extend from the filter head 210 and define a fluid flow pathway leading to the open volume 142 defined by the spacers 140.

A tortuous airflow pathway 195 is defined by the filtration system 200. The tortuous airflow pathway 195 has a first segment 195a and a second segment 195b defined by the filter element 100 (the filter element 100 is more clearly visible in FIGS. 1-3b). Each of the first segment 195a and second segment 195b are tortuous. The main portion 192 of the breather filter housing 190 (see FIG. 3b) and the airflow channel plate 180 mutually define the first segment 195a of the tortuous airflow pathway that extends from a first end 169 of the airflow pathway defined by the secondary protrusion 162 to the second flow face 174 of the breather filter 170. The first end 169 of the airflow pathway 195 is in communication with the interior of the fluid tank 220 through the filter head 210. The filter head 210 defines an airflow channel 216 that is configured to be in sealable communication with the first end 169 of the first tortuous airflow pathway 195a defined by the secondary protrusion 162.

A terminus 222 of the airflow channel 216 is mutually defined by the tank 220 and the filter head 210. In particular, the terminus 222 of the airflow channel 216 can be defined by the interface between the tank 220 and the filter head 210, although other configurations are certainly possible. The terminus of the airflow channel is generally defined herein as the end of the airflow pathway that is in direct fluid communication with the volume of the tank 220. In the current example, the terminus 222 of the airflow channel 216 is in the tank 220, but in other embodiments the terminus can abut the volume defined by the tank 220. When the filter element 100 is uninstalled, such as depicted in FIGS. 1-3b, the first tortuous airflow pathway 195a is generally in communication with the ambient environment.

When the filter element 100 is installed in the filtration system 200, the shroud 128 of the first endcap 120 is configured to extend in the longitudinal direction at least from the terminus 222 of the airflow channel 216 towards the second end 114 of the filter media assembly 110. At least a portion of the shroud 128 is longitudinally aligned with the terminus 222 of the airflow pathway 316. The shroud 128 is positioned between the terminus 222 and the filter media assembly 110. In various embodiments, the shroud 128 is configured to extend past the terminus 222 of the airflow channel 216 in the longitudinal direction by at least 1 inch (2.56 cm).

"Tortuous," as used herein, means that the airflow pathway is at least more convoluted than a straight line. The tortuous airflow pathway can prevent the passage of liquids and debris to the breather filter 170. When the filter element 100 is installed in a filtration system 200, the tortuous airflow pathway 195 can be oriented to enable the drainage of fluids under the force of gravity that might inadvertently enter the tortuous airflow pathway 195. In the current example, a baffle 218 is disposed within the airflow channel 216 to create a tortuous airflow pathway within the airflow channel 216, as well.

The second segment 195b of the tortuous airflow pathway 195 extends between the ambient environment and the first flow face 172 of the breather filter 170. As such, the first segment 195a and the second segment 195b are in communication through the breather filter 170. The second segment 195b of the tortuous airflow pathway 195 is defined by the filter cover 150. In various embodiments, including the one depicted, the second segment 195b of the tortuous airflow pathway 195 is mutually defined by the filter cover 150 and the breather filter housing 190, in particular the airflow channel plate 180.

Figure 5:
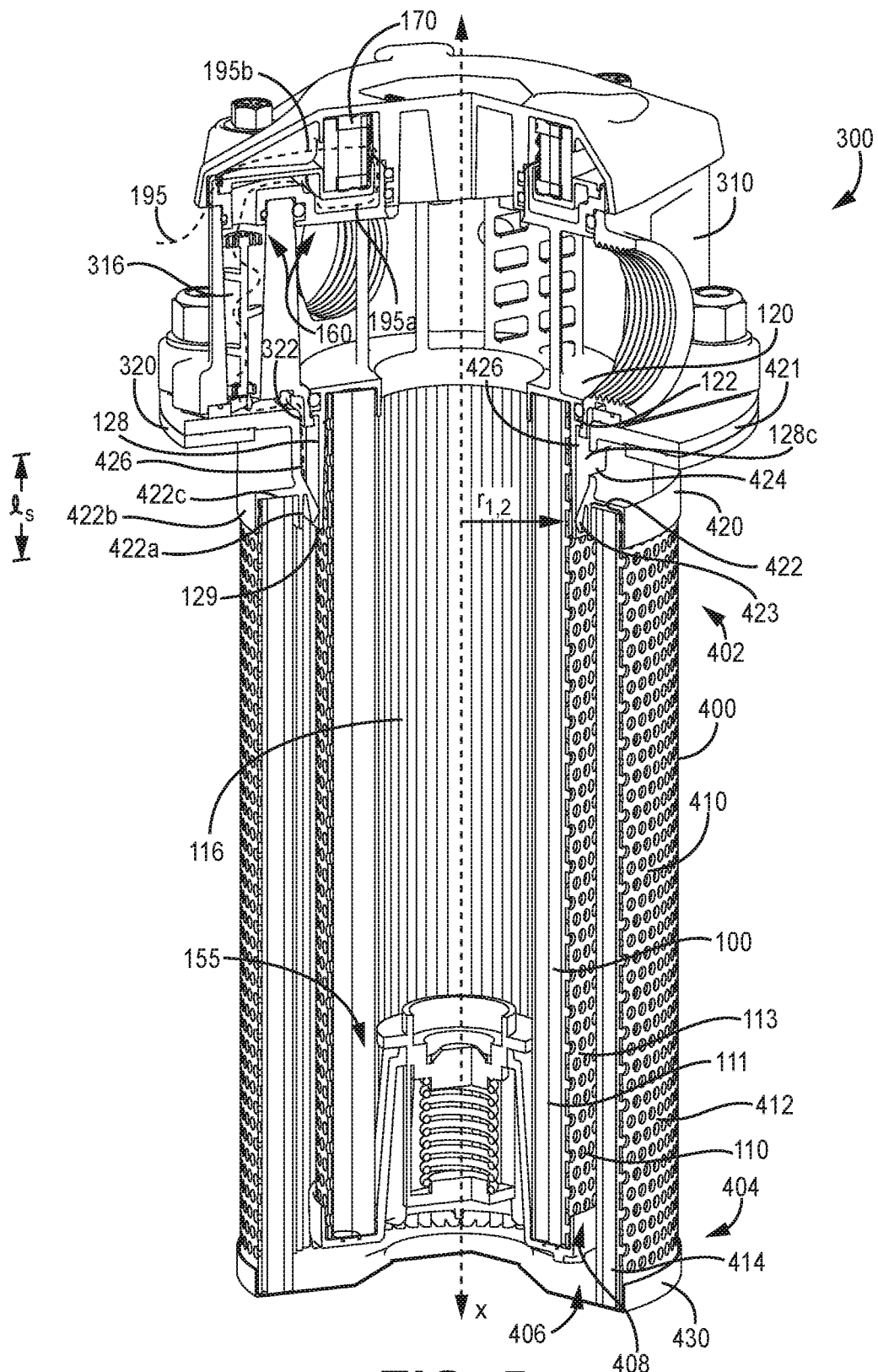
FIG. 5 is a partial cross-section of a perspective view of another example system consistent with the technology disclosed herein.

FIG. 5 is a partial cross-section of a perspective view of another example implementation of a filter element 100 consistent with FIGS. 1-3b. Similar to as discussed above in FIG. 4, the filter element 100 is installed in a filtration system 300. The outer circumferential sealing surface 122 of the first endcap 120 forms a seal with a filter head 310, and the sealing surface 160 (best visible in FIG. 2) similarly forms a seal with the filter head 310. Unlike the example of FIG. 4, here the system has a separator assembly 400 extending around the filter element 100. A perspective view of the example separator assembly 400 is depicted in FIGS. 6a and 6b and a facing view of the separator assembly 400 is depicted in FIG. 6c, which can be viewed in combination with FIG. 5 for the following description.

The separator assembly 400 is generally configured to facilitate the deaeration of the filtered liquid. The separator assembly 400 is configured impede the passage of liquid into the airflow pathway 316. The separator assembly 400 has a first separator endcap 420 and separator material 410 extending from the first separator endcap 420 along the longitudinal axis x. The first separator endcap 420 is coupled to a first longitudinal end 402 of the separator material 410. The separator assembly 400 defines a cavity 406 that is configured to substantially receive the filter element 100.

The first separator endcap 420 is generally configured impede the passage of liquid into the airflow pathway 316. The separator endcap 420 has a radial rim 421 on one longitudinal end and a radial separator potting structure 422 on an opposite longitudinal end (visible in FIG. 5). The radial separator potting structure 422 forms a receiving channel that is configured to receive a first end 402 of the separator material 410. The radial separator potting structure 422 has an inner circumferential flange 422a, an outer circumferential flange 422b, and an annular surface 422c adjoining the inner and outer circumferential flanges 422a, 422b. The inner and outer circumferential flanges 422a, 422b extend in the longitudinal direction about the longitudinal axis x.

The first separator endcap 420 partially defines a portion of the cavity 406 extending between the two longitudinal ends of the first separator endcap 420. The cavity 406 is configured to accommodate the filter element 100. The cavity 406 can be cylindrical, in some embodiments. The first separator endcap 420 defines an inner circumferential seal surface 423 that is configured to form a fluid seal with the shroud 128 of the filter element 100. The inner circumferential seal surface 423 projects radially into the cavity 406. When uninstalled in a system (such as depicted in FIG. 6), the inner circumferential seal surface 423 has a radius $r_1$ that is less than a radius $r_2$ of a corresponding portion of an outer surface 128c of the shroud 128. Upon installation in a filtration system 300, the inner circumferential seal surface 423 is configured to flex radially outward to have a radius $r_1$ equal to the radius $r_2$ of the outer surface 128c of the shroud 128. By "corresponding portion" it is meant that the portion of the outer surface 128c of the shroud 128 and the inner circumferential seal surface 423 are configured to longitudinally align when the separator assembly 400 and the filter element 100 are properly installed in the filtration system 300. In various embodiments, the inner circumferential seal surface 423 is configured to contact the outer surface 128c of the shroud 128 between the outer circumferential sealing surface 122 of the first endcap 120 and the terminal end 129 of the shroud 128.

In various embodiments, the inner circumferential seal surface 423 is constructed of a plastic material. The plastic material can exhibit some elasticity that facilitates forming a seal. In some embodiments the inner circumferential seal surface 423 is constructed of an elastomeric material. The inner circumferential seal surface 423 can be a separate component from the first separator endcap 420. For example, in some embodiments, the inner circumferential seal surface 423 can be an o-ring that is coupled to the first separator endcap 420. In other embodiments, the inner circumferential seal surface 423 is integral with the first separator endcap 420 and, as such, the first separator endcap 420 is constructed of the same material as the inner circumferential seal surface 423. Accordingly, in some embodiments the first separator endcap 420 is an elastomeric material.

Similar to the examples discussed with reference to FIG. 4, the filtration system 300 depicted in FIG. 5 defines a tortuous airflow pathway 195 between a fluid tank 320 and the ambient environment outside of the filtration system 300. The tortuous airflow pathway 195 can have a first segment 195a and a second segment 195b in communication through a breather filter 170. The filter element 100 configuration relevant to the tortuous airflow pathway 195 is as described above with respect to FIG. 4. Similarly, an airflow pathway 316, which is in communication with the tortuous airflow pathway 195, can be defined by the filter head 310. However, in the current example, the filter head 310 and the separator assembly 400 mutually define a terminus 322 of the airflow pathway 316 abutting the interior volume of the tank 320. At least a portion of the shroud 128 is longitudinally aligned with the terminus 322 of the airflow pathway 316. The shroud 128 is positioned between the terminus 322 and the filter media assembly 110. The shroud 128 has a length is from the terminus towards the second end 404 of the filter media assembly (in the longitudinal direction) of at least one inch (2.56 cm), in some embodiments.

The first separator endcap 420 and the first endcap 120 of the filter element 100 generally define an air gap 426 therebetween (FIG. 5). The air gap 426 from the inner circumferential sealing surface 423 towards the outer circumferential sealing surface 122 of the first endcap 120. The air gap 426 is in fluid communication with the terminus 322 of the airflow pathway 316 of the filter head 310. As such, the air gap 426 is also in fluid communication with the second segment 195b of the tortuous airflow pathway 195. An air channel opening 424 extends through the first separator endcap 420 to be in fluid communication with the air gap 426. The air channel opening 424 is defined between the radial rim 421 and the inner circumferential seal surface 423 of the first separator endcap 420 relative to the longitudinal direction. As such, the air channel opening 424 is in direct fluid communication with the air gap 426. The air channel opening 424 is generally configured to facilitate airflow between the tank 320 (a portion of which is depicted in FIG. 5) and the tortuous airflow pathway 195. In some embodiments there is a single air channel opening 424, and in other embodiments there are a plurality of discrete air channel openings 424.

As mentioned above, the separator assembly 400 has the separator material 410 extending longitudinally from the first separator endcap 420. The separator material 410 mutually defines the cavity 406 extending along the longitudinal axis x. In various embodiments, the portion of the cavity 406 defined by the separator material 410 is generally cylindrical. In various embodiments, the separator assembly 400 and the filter element 100 mutually define a fluid gap 408 therebetween. The fluid gap 408 receives aerated filtered liquid from the filter element 100 and provides the opportunity for gases in the liquid to nucleate (causing the liquid to de-aerate) before passing through the separator assembly 400 into the tank 320.

The separator material 410 has separator media 414 disposed about the longitudinal axis x. The separator media 414 is generally configured to facilitate the deaeration of the filtered liquid. In various embodiments, the separator media 414 has a higher permeability than the filter media 111. In some embodiments, the separator media 414 does not have a filtration efficiency, and in some other embodiments, the separator media 414 has a lower filtration efficiency than the filter media 111. In some embodiments incorporating the bypass assembly 155, the separator media 414 can have an efficiency sufficient to meet minimum filtration requirements for the bypass fluid.

The separator media 414 can be consistent with a porous barrier disclosed in U.S. Pat. App. No. 62/798,272 entitled "System and Method for Deaeration," which is incorporated by reference in its entirety to the extent a specific teaching is not contradictory. In some such embodiments, the filter media assembly 110 can incorporate a gas nucleation media and a growth media also as-disclosed in the above-referenced patent application. As an example, the growth nucleation media and the growth media can be sheets of media that are wrapped around the outer circumferential limit 111a of the filter media 111 and are positioned between the filter media 111 and the structural support 113. The gas nucleation media can be configured to cause at least some dissolved gases in a fluid to nucleate and to form free air, and the growth media can be configured to cause the pockets of gas to grow.

The separator media 414 can act to hold the gas cavities in the fluid gap 408, preventing the gas cavities from dispersing into the fluid in the tank 320 prematurely. In some embodiments the separator media 414 can cause the gas cavities to further grow and/or coalesce on the upstream side of the separator media 414 and to rise upward within the fluid gap 408. A gas pocket (a large gas cavity) can form at the top of the fluid gap 408 from the risen coalesced gas when the separator media 414 is wetted. Once the gas pocket grows large enough, enough pressure builds for the gas pocket to break through the wetted separator media 414. As the gas breaks through the separator media 414, it can dry the separator media 414 in the immediate area, allowing the air pocket to bleed out. However, even if the area of the separator media stays submerged and wetted, the gas cavity at the top of the fluid gap 408 can push through the separator media 414 as a large bubble and float upward to the surface. If the separator media is submerged, the gas pocket can be large and buoyant enough to rise to the surface and escape the surface. In the absence of the gas pocket, the separator media 414 will rewet and the process can repeat.

The separator media can have any suitable porous material defining openings or pores extending through the separator media. Multiple aspects of the separator media can affect the effectiveness and efficiency of the separator media. For example, aspects that influence the efficiency of the separator media can include pore size and pore shape, and regularity or uniformity of pore size and shape throughout the separator media; chemical composition of the separator media; oleophilicity/oleophobicity of the separator media; surface roughness or smoothness of the separator media; and the direction/orientation of the separator media relative to the direction of flow. One or more of these properties can be different on the upstream side than the downstream side or exhibit a gradient from the upstream side to the downstream side.

In some embodiments, the separator media can incorporate woven or nonwoven material. The openings can be uniformly sized or nonuniform, including openings of various sizes. The pores of the separator media can also be referred to as openings and are understood to mean holes (for example through holes) in the separator media. The size of the openings can be determined by ASTM E11, ASTM E2814-11, ASTM E2016-11, or by optical imaging, where the opening size is a width across the opening, such as a diameter of a circular opening or length of a side of a square opening. The separator media can define openings sized 5 µm or greater, 10 µm or greater, 15 µm or greater, or 20 µm or greater. The separator media can define openings sized 1 mm or smaller, 750 µm or smaller, 500 µm or smaller, 250 µm or smaller, 200 µm or smaller, 150 µm or smaller, or 100 µm or smaller. In examples, the separator media defines openings sized from 10 µm to 120 µm, from 15 µm to 100 µm, or from 20 µm to 80 µm. In some examples, the separator media defines openings having a width of about 50 µm.

In some embodiments, the openings of the separator media are uniform in size (e.g., have a narrow pore size distribution). For example, in some embodiments, at least some openings, a majority of openings, at least 90% of openings, at least 95% of openings, or at least 99% of openings of the separator media are within the size ranges specified here, as determined by total opening area of the separator media. In one embodiment, all of the openings of the separator media are within the size ranges specified here.

The openings of the separator media can have any suitable shape. For example, the openings can be rectangular, square, round, oval, or any other suitable shape. The shape can be determined by viewing the separator media from a direction perpendicular to a plane of the separator media tangential to the particular opening. In some embodiments, the openings of the separator media are uniform in shape. For example, in some embodiments, at least some openings, a majority of openings, at least 90% of openings, at least 95% of openings, or at least 99% of openings of the separator media have the same shape (e.g., are rectangular, square, round, oval, etc.).

The separator media 414 can be made of a woven or non-woven material. For example, the separator media 414 can be made of a woven mesh. The woven mesh can have a wire diameter (or cross dimension) of at least 0.01 mm, at least 0.05 mm or at least 0.1 mm. The woven mesh can have a wire diameter (or cross dimension) of up to 10 mm, up to 2 mm, up to 1 mm, or up to 0.5 mm. In one embodiment, the separator media 414 incorporates a pleated material, such as a pleated woven mesh. The separator media 414 can be made of any suitable material. For example, the separator media can be made of a material with suitable oleophilicity/oleophobicity to encourage further growth of gas cavities and to allow gas cavities to pass through the separator media. In some embodiments, the separator media or a part of the separator media is oleophobic.

According to some embodiments, at least one side of the separator media is oleophilic. In some embodiments, the separator media exhibits an oleophobicity gradient, where the upstream side of the separator media is more oleophobic than the downstream side. Oleophobicity of a material can be expressed as an oil rating measured according to AATCC TM118. The separator media can have an oil rating of at least 1, at least 1.5, or at least 2. The separator media can have an oil rating of up to 10, up to 8, or up to 6.

For example, the separator media 414 can be made of metal, such as stainless steel, or woven or non-woven media made from one or more of cellulose; regenerated cellulose (e.g., rayon); synthetic materials such as polyamide, polyester, nylon, polyethersulfone (PES), polypropylene (PP), polyethylene (PE), polytetrafluoroethylene (PTFE), polyvinylidene difluoride (PVDF); glass (including micro-glass); ceramic; or carbon fiber. In embodiments, the separator media 414 is made from a woven metallic mesh, such as stainless steel mesh. In some embodiments, the separator media 414 has a pleated wire mesh. The pleated wire mesh can be stainless steel. In some embodiments, the separator media 414 has a multiple layers of wire mesh. For example, the separator media 414 can be constructed with a first layer of wire mesh abutting a second layer of wire mesh. In some examples, the separator media 414 is constructed of a first layer of stainless steel wire mesh abutting a second layer of carbon steel mesh that are pleated. In embodiments where the separator media 414 is multiple layers of wire mesh, the layers of wire mesh can be co-pleated. In some embodiments, the fibers (for example metallic fibers) are coated. Polymeric or non-polymeric coatings, such as resins, can be used. The separator media 414 can be arranged in a tubular shape.

The separator media can exhibit microtexture and macrotexture. Microtexture is used here to refer to the surface texture of the separator media at the level of individual fibers or wires that make up the separator media (e.g., referring to variations smaller than 1 mm in size). Microtexture can also be referred to as surface roughness. Macrotexture is used here to refer to the surface texture of the separator media overall (e.g., referring to variations greater than 1 mm in size). The separator media can exhibit surface roughness. For example, separator media can have a surface roughness of at least 1 nm, at least 10 nm, at least 25 nm, at least 50 nm, or at least 100 nm. The separator media can have a surface roughness of up to 1000 nm, up to 500 nm, or up to 200 nm. In some embodiments, the separator media has little or no macrotexture, i.e., the separator media is "smooth," with the exception that the separator media can be pleated.

Additional characterizations for the separator media surface include skewness, kurtosis, and sharpness or pointedness. The skewness of the fibers can be at least −10, at least −8, or at least −6. The skewness of the fibers can be up to 6, up to 8, or up to 10. The fibers of the separator media can have a kurtosis of at least −10, at least −8, or at least −6. The fibers of the separator media can have a kurtosis of up to 6, up to 8, or up to 10. Combinations of certain surface roughness, skewness, and kurtosis can result in favorable capture properties. For example, high roughness and high kurtosis can be beneficial to capture. The fibers of the separator media can have a radius of curvature can be up to 2 nm, up to 5 nm, up to 10, up to 50, up to 100, or up to 500 nm.

The separator media can have an initial, clean differential pressure of at most 0.01 psi, at most 1 psi, or at most 100 psi, per ISO 16889 run at a suitable face velocity.

The separator media can be positioned generally perpendicular to the direction of flow. For example, the separator media can be cylindrical with a cylindrical wall that is coaxial with the filter media 111. In some embodiments, the separator media incorporates pleated material, where the faces of the pleats are oblique relative to the direction of flow.

In the current example, the separator material 410 also has a structural support layer 412 defining an outer radial boundary of the separator material 410. The structural support layer 412 is configured to prevent collapse of the other layers of the separator material 410. The description of the structural support 113 of the filter media assembly 110 above applies to the structural support layer 412 as well. In some embodiments a structural support layer 412 can be omitted, and in other embodiments multiple structural support layers can be incorporated in the filtration system 300. In some embodiments the structural support layer 412 can also help facilitate the deaeration of the filtered liquid.

In example implementations where the filtration system 300 is used for pressurized liquid filtration, the pressurized liquid flows through the filter head 310 into the central opening 116 of the filter element 100. The liquid travels through the filter media assembly 110 and is filtered in the process. The liquid flow can cause aeration of the liquid, generating froth around the filter element 100 in the fluid gap 408. The inner circumferential sealing surface 423 and the outer surface 128c of the shroud 128 blocks the generated froth from rising up into the air gap 426 to the terminus 322 of the airflow pathway 316, which can prevent the liquid forming the froth from entering the terminus 322 of the airflow pathway 316. The aerated liquid de-aerates, which is facilitated, at least in part, by the separator assembly 400.

In the current example, the separator assembly 400 has a second separator endcap 430 coupled to a second longitudinal end 404 of the separator material 410. In some embodiments, the second separator endcap 430 extends across the cavity 406 of the separator assembly 400 to form an obstruction across the cavity 406 (see FIGS. 5 and 6a). Such configurations can be desirable where the separator assembly 400 is used for filtration of bypass fluid. In some embodiments a relief valve can be incorporated in the second separator endcap 430 that is configured to open at a threshold pressure within the separator assembly 400.

Figure 8:
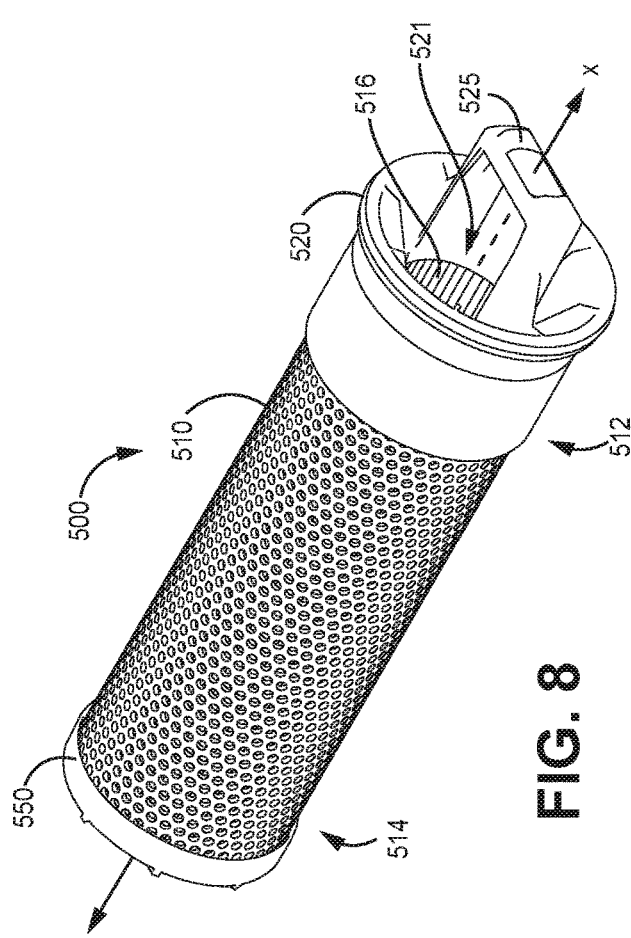
FIG. 8 is a perspective view of yet another example filter element consistent with the technology disclosed herein.
Figure 9:
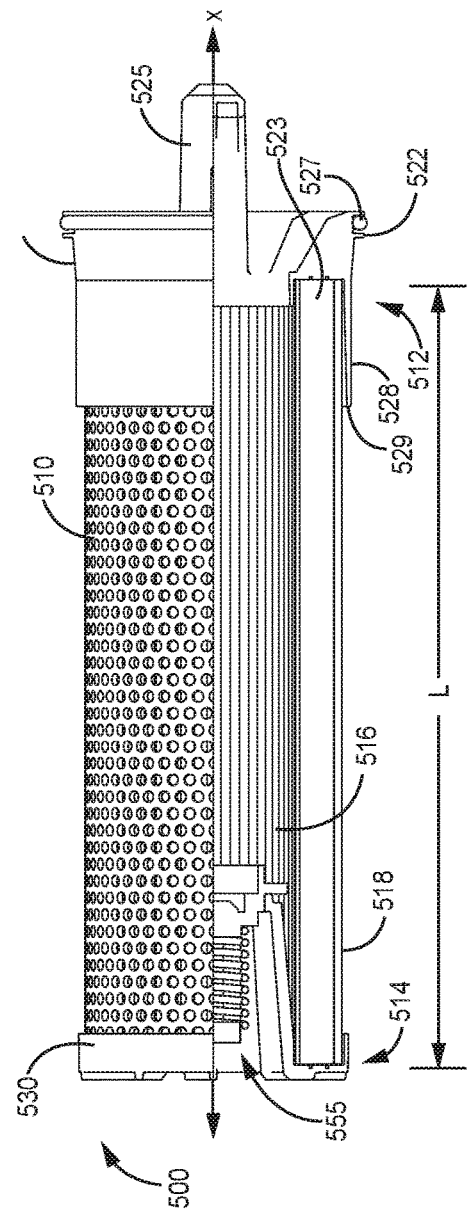
FIG. 9 is a partial cross-sectional view of the example filter element of FIG. 8.

FIG. 8 depicts a perspective view of another filter element consistent with the technology disclosed herein, and FIG. 9 depicts a partial perspective view of an example filter element of FIG. 8. The filter element 500 has filter media assembly 510 extending between a first end 512 and a second end 514 to define a media length L along a longitudinal axis x. The filter media assembly 510 defines a central opening 516 on an upstream side and an outer radial boundary 518 (particularly visible in FIG. 9) along the longitudinal axis x on a downstream side. A first endcap 520 is coupled to the first end 512 of the filter media assembly 510 and a second endcap 530 is coupled to the second end 514 of the filter media assembly 510 such that the filter media assembly 510 extends between the first endcap 520 and the second endcap 530 in the longitudinal direction. The first endcap 520 has an outer circumferential sealing surface 522 about the longitudinal axis x and a shroud 528 that extends longitudinally from the outer circumferential sealing surface 522 towards the second end 514 of the filter media assembly 510.

The filter media assembly 510 is generally consistent with the description of the filter media assemblies of FIGS. 1-4 and has filter media 511. The second endcap 530 is generally consistent with the description of the second endcap of FIGS. 1-4. Also, as is visible in FIG. 9, the filter element 500 incorporates a bypass assembly 555 that is consistent with the description earlier herein.

The first endcap 520 has various similarities to those examples described above, in that the first endcap 520 is configured to retain the ends of the filter media assembly 510 and create a portion of a fluid flow pathway through the filter media assembly 510. The first endcap 520 defines an endcap opening 521 that is in communication with the central opening 516 of the filter media assembly 510. As is best visible in FIG. 9, the first endcap 520 has a media potting structure 523 that is configured to receive the first end 512 of the filter media assembly 110. The media potting structure 523 has a similar configuration to those described above.

The outer circumferential sealing surface 522 and the shroud 528 also have a similar configuration, functionality, and structure to the corresponding components discussed earlier herein. At least a portion of the media potting structure 523 defines a portion of the shroud 528 and the shroud 528 extends longitudinally from the media potting structure 523 towards the second end 514 of the filter media assembly 510. The media potting structure 523 is positioned between the outer circumferential sealing surface 522 and a terminal end 529 of the shroud 528.

In the current example, however, the first endcap 520 has differences than other first endcaps described earlier herein. In particular, the first endcap 520 lacks a breather filter and spacers, for example. Here the first endcap 520 has a handle 525 extending longitudinally outward from the filter media assembly 510. The handle 525 can be configured to be manually graspable by a user.

Figure 10:
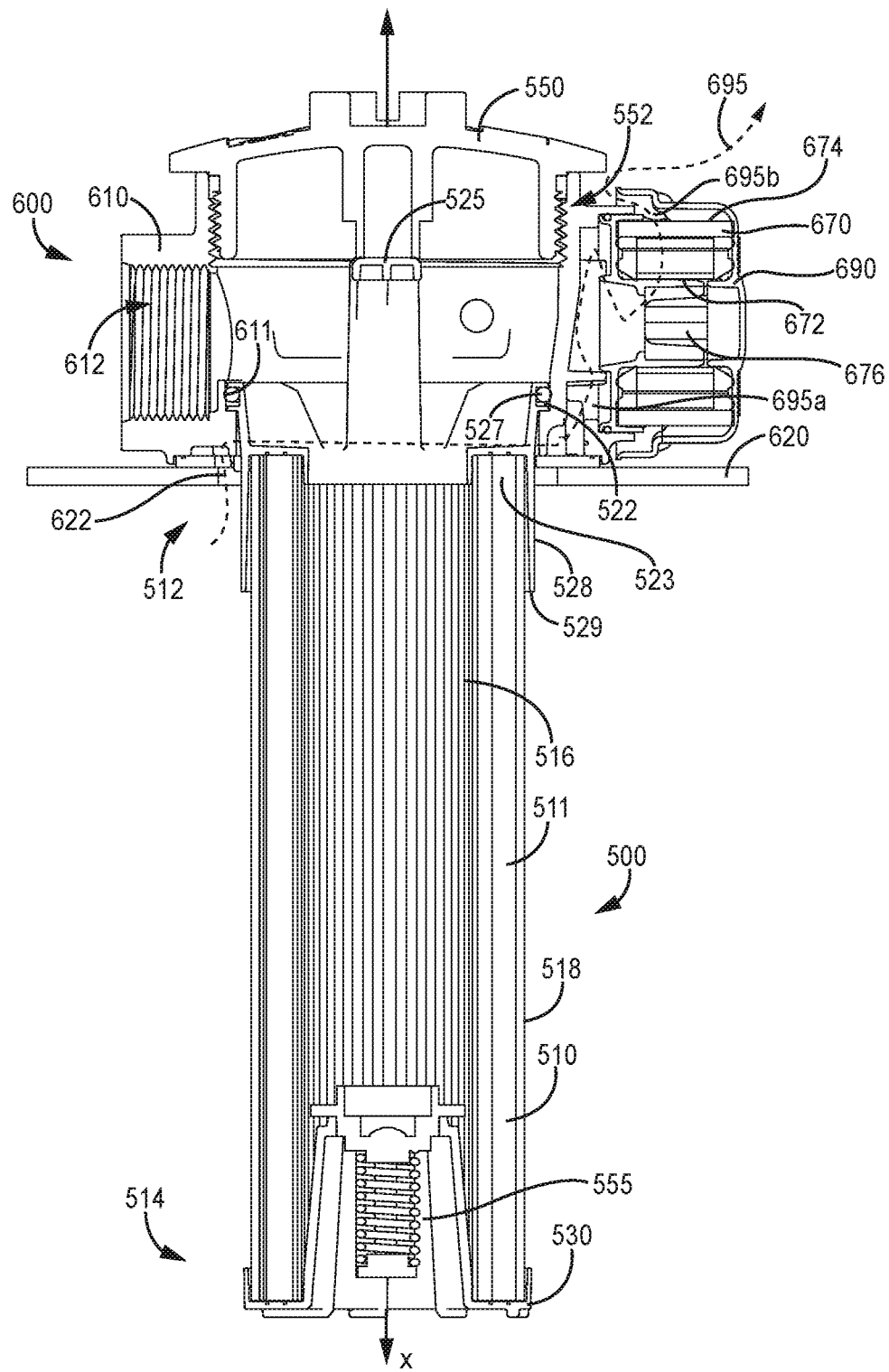
FIG. 10 is a cross-sectional view of an example system consistent with some implementations of the current technology.

FIG. 10 depicts an example implementation of the filter element of FIGS. 8-9 in a filtration system 600 consistent with various examples. The filter element 500 is installed in a filtration system 600. In particular, the filter media assembly 510 of the filter element 500 is disposed in a fluid tank 620 (only a portion of which is depicted for clarity), and a filter cover 550 is coupled to a filter head 610 via the mating features 552 which, in the current example, is a screw connection. Similarly, the outer circumferential seal 527 disposed about the first endcap 520 forms a seal with a corresponding structure of the filter head 610. The corresponding structure of the filter head 610 is an inner radial sealing surface 611, in the current example. One or more conduits 612 extend from the filter head 610 and define a fluid flow pathway leading to the central opening 516 of the filter media assembly 510 via the first endcap 520.

In the current example, a breather filter 670 is integral to the filter head 610. The breather filter 670 can be consistent with other breather filters described herein. The filter head 610 has a breather filter housing 690 that receives the breather filter 670. The breather filter 670 defines a first flow face 672, a second flow face 674, and a central opening 676.

An airflow pathway 695 is defined by the filtration system 600. Unlike the examples of FIGS. 4 and 5, here the filter element 500 alone does not define particular segments of the airflow pathway 695. The airflow pathway 695 has a first segment 695a and a second segment 695b defined by the filtration system 600 components. While the first segment 695a can be considered tortuous, here the second segment 695b is not necessarily tortuous. The filter head 610 defines the second segment 695b of the airflow pathway, and the first segment 695a of the airflow pathway 695 is mutually defined by the filter head 610, filter element 500, and the tank 620. The first segment 695a extends from the tank 620 to the first flow face 672 of the breather filter 670 and the second segment 695b extends from the second flow face 674 of the breather filter 670 to the ambient environment. As such, the first segment 695a and the second segment 695b are in communication through the breather filter 670.

A terminus 622 of the airflow pathway 695 is defined by the tank 620 within in the volume of the tank 620. In particular, the terminus 622 of the airflow pathway 695 is mutually defined by the tank 620 and the filter element 500. More particularly, the terminus 622 of the airflow pathway 695 can be defined by the interface between the tank 620 and the filter element 500 and/or the tank 620 and the first endcap 520, although other configurations are certainly possible. As described in the discussion of FIG. 4, here the shroud 528 is configured to extend longitudinally from the terminus 622 of the airflow pathway 695 towards the second end 514 of the filter media assembly 510.

Figure 11:
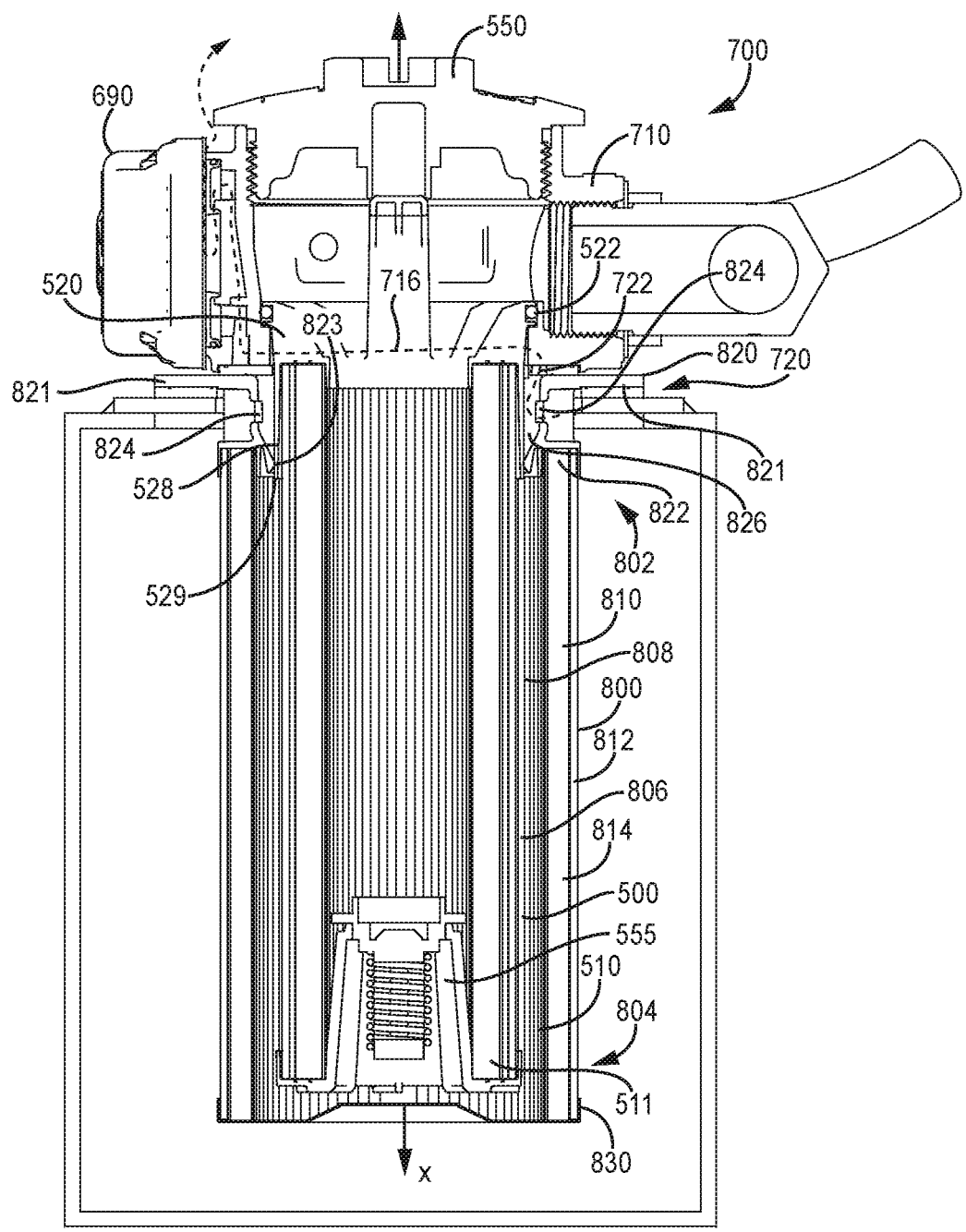
FIG. 11 is a partial cross-sectional view of another example system consistent with the current technology.

FIG. 11 is a cross-sectional view of another example implementation of a filter element 500 consistent with FIGS. 8-9. Similar to as discussed above in FIG. 10, the filter element 500 is installed in a filtration system 700. The outer circumferential sealing surface 522 of the first endcap 520 forms a seal with a filter head 710. Unlike the example of FIG. 10, here the system has a separator assembly 800 extending around the filter element 500.

The separator assembly 800 is generally consistent with separator assemblies already discussed herein. The separator assembly 800 is configured impede the passage of liquid into an airflow pathway 716 defined by the filtration system 700, particularly at a terminus 722 of the airflow pathway 716. The terminus 722 of the airflow pathway 716 is mutually defined by the filter element 500 and the filter head 710 in this example. As discussed in the previous example, at least a portion of the shroud 528 is longitudinally aligned with the terminus 722 of the airflow pathway 716. The shroud 528 is positioned between the terminus 722 and the filter media assembly 510. The shroud 528 extends longitudinally from the terminus 722 of the airflow pathway 716 towards the second end 514 of the filter media assembly 510 by a particular distance. The separator assembly 800 has a first separator endcap 820 and separator material 810 extending from the first separator endcap 820 along the longitudinal axis x. The first separator endcap 820 is coupled to a first longitudinal end 802 of the separator material 810. The separator assembly 800 defines a cavity 806 that is configured to substantially receive the filter element 500.

The separator endcap 820 has a radial rim 821 on one longitudinal end and a radial separator potting structure 822 on an opposite longitudinal end. The radial separator potting structure 822 forms a receiving channel that is configured to receive a first end 802 of the separator material 810, as discussed above with reference to FIG. 5. The first separator endcap 820 partially defines a portion of the cavity 806 extending between the two longitudinal ends of the first separator endcap 820. The cavity 806 is configured to accommodate the filter element 500.

The first separator endcap 820 defines an inner circumferential seal surface 823 that is configured to form a fluid seal with the shroud 528 of the filter element 500. The inner circumferential seal surface 823 projects radially into the cavity 806. When uninstalled in a system, the inner circumferential seal surface 823 has a radius that is less than a corresponding radius of an outer surface of the shroud 528. Upon installation in the filtration system 700, the inner circumferential seal surface 823 is configured to flex radially outward to have a radius $r_1$ equal to the radius $r_2$ of the outer surface of the shroud 528. In various embodiments, the inner circumferential seal surface 823 is configured to contact the outer surface of the shroud 528 between the outer circumferential sealing surface 522 of the first endcap 520 and the terminal end 529 of the shroud 528. The inner circumferential seal surface 823 can be constructed consistently with inner circumferential seal surfaces discussed herein above.

Similar to the examples discussed with reference to FIG. 10, the filtration system 700 depicted in FIG. 11 defines an airflow pathway 716 between a fluid tank 720 and the ambient environment outside of the filtration system 700. The airflow pathway 716 can have a first segment and a second segment in communication through the breather filter (not currently visible) as discussed above with respect to FIG. 10. The filter head 710 and/or the tank 720 and the separator assembly 800 mutually define the terminus 722 of the airflow pathway 716.

The first separator endcap 820 and the first endcap 520 of the filter element 500 generally define an air gap 826 therebetween. The air gap 826 is defined from the inner circumferential sealing surface 823 towards the outer circumferential sealing surface 522 of the first endcap 520. In particular, the air gap 826 is extends longitudinally from the inner circumferential sealing surface 823 to the filter head 710 about the filter element 500. The air gap 826 is in fluid communication with the terminus 722 of the airflow pathway 716. An air channel opening 824 extends through the first separator endcap 820 to be in fluid communication with the air gap 826. The air channel opening 824 is defined between the radial rim 821 and the inner circumferential seal surface 823 of the first separator endcap 820 relative to the longitudinal direction. As such, the air channel opening 824 is in direct fluid communication with the air gap 826. The air channel opening 824 is generally configured to facilitate airflow between the tank 720 and the airflow pathway 716. In this example there are a plurality of discrete air channel openings 824.

As discussed above in detail, the separator assembly 800 has the separator material 810 extending longitudinally from the first separator endcap 820. The separator material 810 mutually defines the cavity 806 extending along the longitudinal axis x. In various embodiments, the portion of the cavity 806 defined by the separator material 810 is generally cylindrical. In various embodiments, the separator assembly 800 and the filter element 500 mutually define a fluid gap 808 therebetween. The fluid gap 808 receives aerated filtered liquid from the filter element 500 and provides the opportunity for gases in the liquid to nucleate (causing the liquid to de-aerate) before passing through the separator assembly 800 into the tank 720.

The separator material 810 has separator media 814 disposed about the longitudinal axis x. The separator media 814 is generally configured to facilitate the deaeration of the filtered liquid. In various embodiments, the separator media 814 has a higher permeability than the filter media 511. In some embodiments, the separator media 814 does not have a filtration efficiency, and in some other embodiments, the separator media 814 has a lower filtration efficiency than the filter media 511. In some embodiments incorporating the bypass assembly 555, the separator media 814 can have an efficiency sufficient to meet minimum filtration requirements for the bypass fluid. The separator media 814 can be consistent with separator medias discussed earlier herein. The separator material 810 can also have a structural support layer 812 similar to that described earlier herein.

The separator assembly 800 also has a second separator endcap 830 coupled to a second longitudinal end 804 of the separator material 810. The second separator endcap 830 can be consistent with those already described herein.

Figure 12:
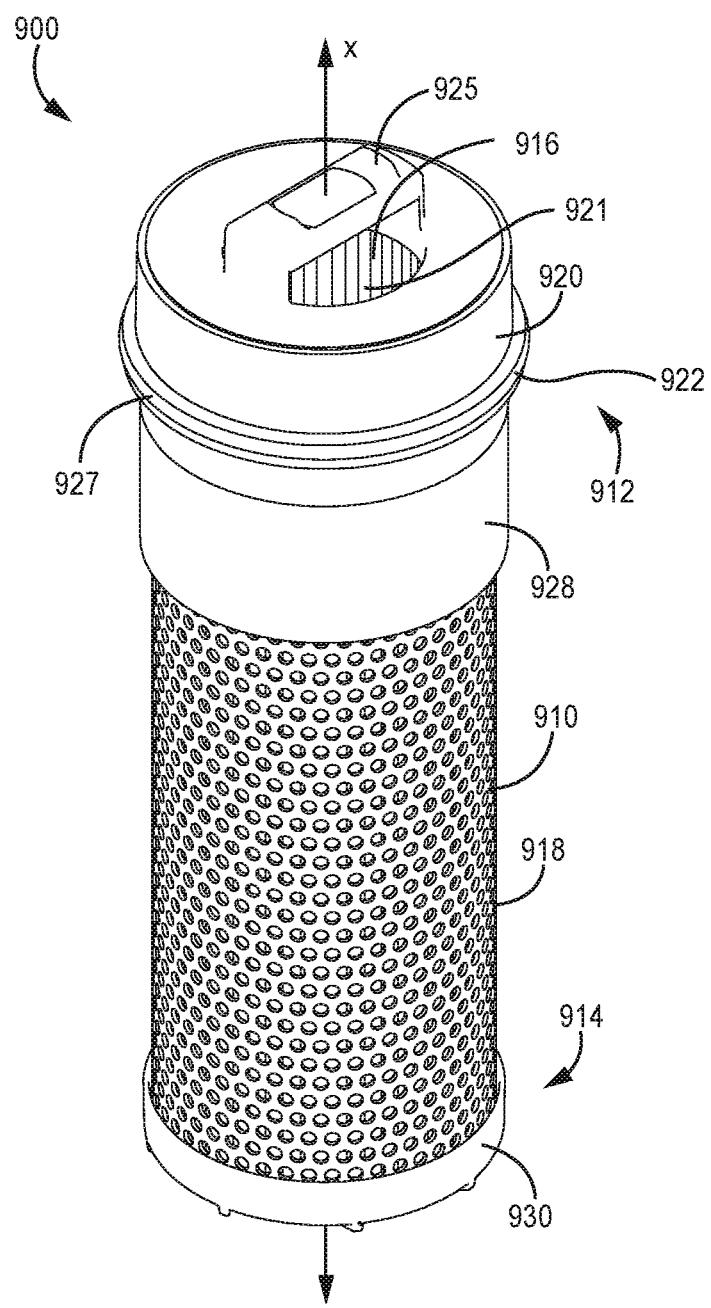
FIG. 12 is a perspective view of yet another example filter element consistent with the technology disclosed herein.
Figure 13:
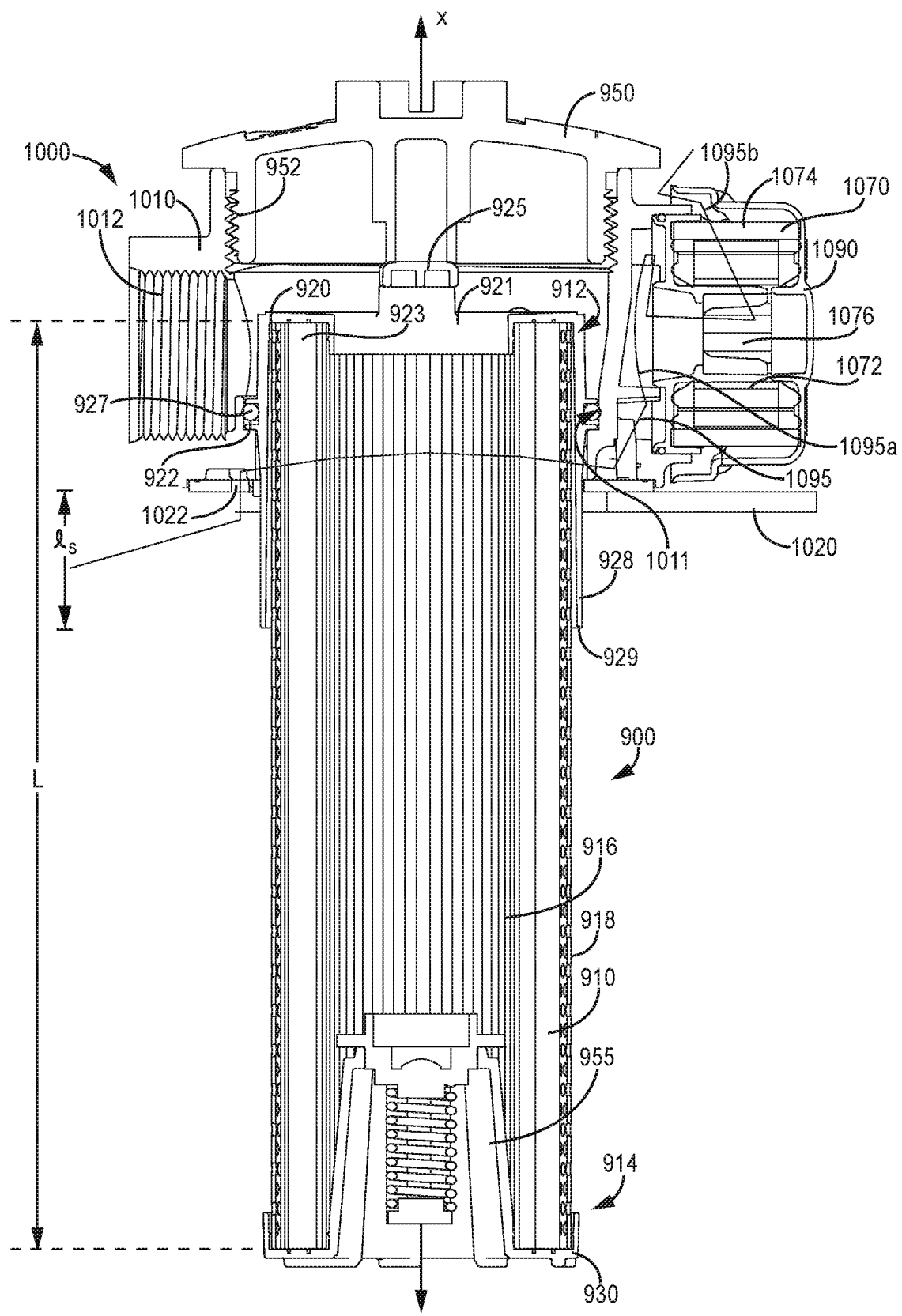
FIG. 13 is a cross-sectional view of an example system consistent with some examples.

FIG. 12 is a perspective view of yet another example filter element 900 consistent with the technology disclosed herein and FIG. 13 is a cross-sectional view of the example filter element 900 installed in a filtration system 1000 consistent with example implementations. The filter element 900 has filter media assembly 910 extending between a first end 912 and a second end 914 to define a media length L along a longitudinal axis x. The filter media assembly 910 defines a central opening 916 on an upstream side and an outer radial boundary 918 (particularly visible in FIG. 13) along the longitudinal axis x on a downstream side. A first endcap 920 is coupled to the first end 912 of the filter media assembly 910 and a second endcap 930 is coupled to the second end 914 of the filter media assembly 910 such that the filter media assembly 910 extends between the first endcap 920 and the second endcap 930 in the longitudinal direction. The first endcap 920 has an outer circumferential sealing surface 922 about the longitudinal axis x and a shroud 928 that extends longitudinally from the outer circumferential sealing surface 922 towards the second end 914 of the filter media assembly 910.

The filter media assembly 910 is generally consistent with the description of the filter media assemblies described above. The second endcap 930 is generally consistent with the description of the second endcap described above. Also, as is visible in FIG. 13, the filter element 900 incorporates a bypass assembly 955 that is consistent with the description earlier herein. The first endcap 920 has various similarities to those examples described above, in that the first endcap 920 is configured to retain the first end 912 of the filter media assembly 910 and create a portion of a fluid flow pathway through the filter media assembly 910. The first endcap 920 defines an endcap opening 921 that is in communication with the central opening 916 of the filter media assembly 910. As is best visible in FIG. 13, the first endcap 920 has a media potting structure 923 that is configured to receive the first end 912 of the filter media assembly 910. The media potting structure 923 has a similar configuration to those described above.

The outer circumferential sealing surface 922 and the shroud 928 also have a similar configuration, functionality, and structure to the corresponding components discussed earlier herein. At least a portion of the media potting structure 923 defines a portion of the shroud 928 and the shroud 928 extends longitudinally from the media potting structure 923 towards the second end 914 of the filter media assembly 910. The shroud 928 also extends longitudinally from the outer circumferential sealing surface 922 towards the second end 914 of the filter media assembly 910. In the current example, however, the outer circumferential sealing surface 922 is positioned between the media potting structure 923 and a terminal end 929 of the shroud 928. In the current example, the shroud 928 defines the outer circumferential sealing surface 922. A portion of the shroud 928 is between the media potting structure 923 and the outer circumferential sealing surface 922.

Similar to the example described above with reference to FIGS. 8-10, here the first endcap 920 lacks a breather filter and spacers and the first endcap 920 has a handle 925 extending longitudinally outward from the filter media assembly 910. The handle 925 can be configured to be manually graspable by a user.

The filter media assembly 910 of the filter element 900 is inserted within a fluid tank 1020 (only a portion of which is depicted for clarity), and a filter cover 950 is coupled to a filter head 1010 via the mating features 952 which, in the current example, is a screw connection. Similarly, the outer circumferential seal 927 disposed about the first endcap 920 forms a seal with a corresponding structure of the filter head 1010. The corresponding structure of the filter head 1010 is an inner radial sealing surface 1011, in the current example. One or more conduits 1012 extend from the filter head 1010 and define a fluid flow pathway leading to the central opening 916 of the filter media assembly 910 via the first endcap 920.

In the current example, a breather filter 1070 is integral to the filter head 1010. The breather filter 1070 can be consistent with other breather filters described herein. The filter head 1010 has a breather filter housing 1090 that receives the breather filter 1070. The breather filter 1070 defines a first flow face 1072, a second flow face 1074, and a central opening 1076.

An airflow pathway 1095 is defined by the filtration system 1000. Here the filter element 900 alone does not define particular segments of the airflow pathway 1095. The airflow pathway 1095 has a first segment 1095a and a second segment 1095b defined by the filtration system 1000 components. While the first segment 1095a can be considered tortuous, here the second segment 1095b is not necessarily tortuous. The filter head 1010 defines the second segment 1095b of the airflow pathway, and the first segment 1095a of the airflow pathway 1095 is mutually defined by the filter head 1010 and the tank 1020. The first segment 1095a extends from the tank 1020 to the first flow face 1072 of the breather filter 1070 and the second segment 1095b extends from the second flow face 1074 of the breather filter 1070 to the ambient environment. As such, the first segment 1095a and the second segment 1095b are in communication through the breather filter 1070.

A terminus 1022 of the airflow pathway 1095 is defined by the tank 1020. In particular, the terminus 1022 of the airflow pathway 1095 can be defined by the interface between the tank 1020 and the filter element 900 and, in particular, the tank 1020 and the first endcap 920, although in other configurations the terminus is defined by the tank 1020 itself. At least a portion of the shroud 928 is longitudinally aligned with the terminus 1022. The shroud 928 is positioned between the terminus 1022 and the filter media assembly 910. The shroud 928 is configured to extend longitudinally from the terminus 1022 of the airflow pathway 1095 towards the second end 914 of the filter media assembly 910 by a particular distance. The length of the shroud is extending past the terminus 1022 towards the second end 914 of the filter media assembly 910 can be at least 1 inch (2.56 cm).

While the filter element 900 is depicted in a filtration system 1000 lacking a separator assembly (such as discussed with references to FIGS. 5, 6a-6c, and 11), in some embodiments the filter element 900 can be incorporated in a system with a separator assembly.

Figure 14:
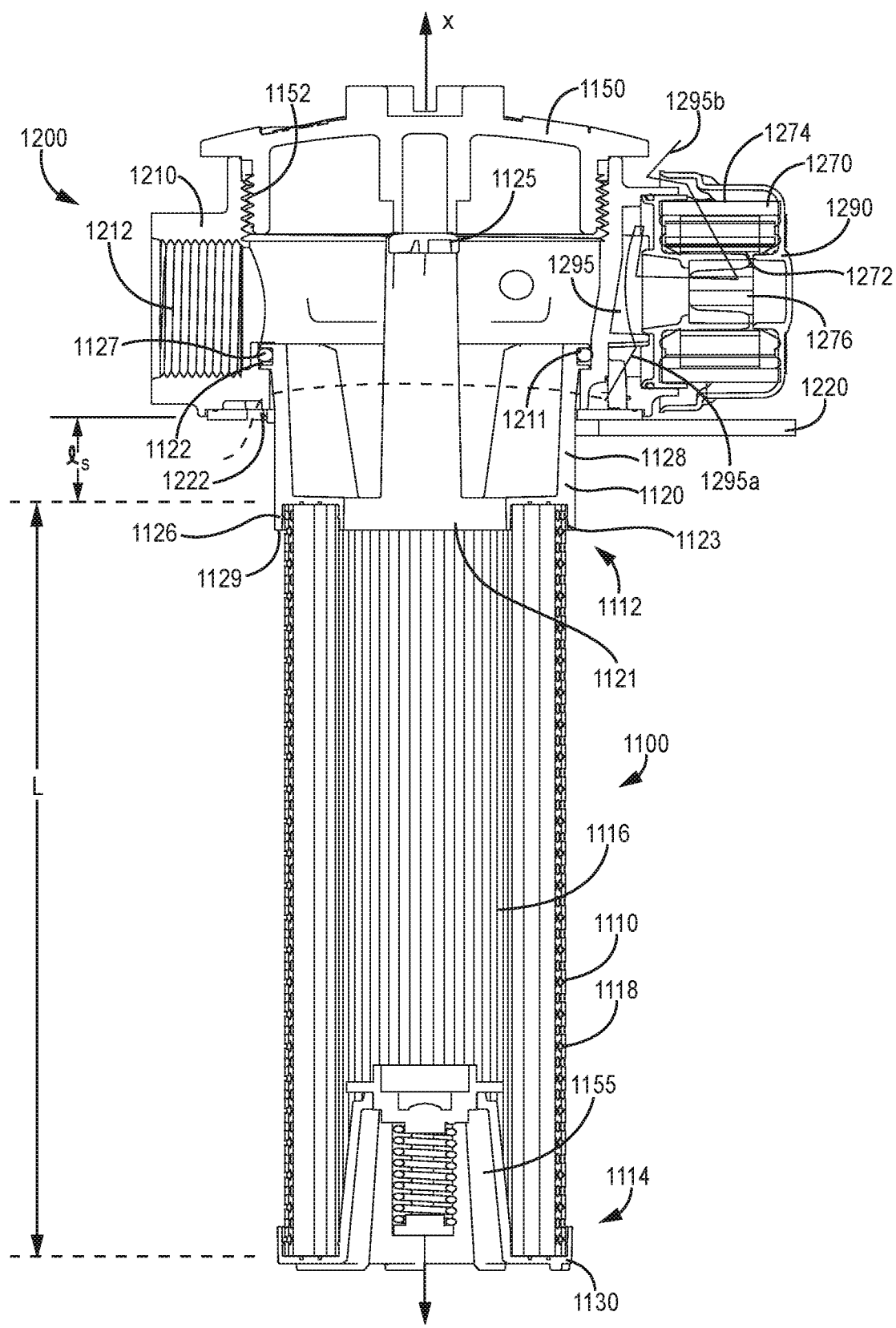
FIG. 14 is a cross-sectional view of yet another example system consistent with some examples.

FIG. 14 is a cross-sectional view of yet another example filter element 1100 installed in a filtration system 1200 consistent with example implementations. Similar to the example of FIG. 13, here the filtration system 1200 lacks a separators assembly, but it will be appreciated that a separator assembly can be incorporated in a modified system. The filter element 1100 has filter media assembly 1110 extending between a first end 1112 and a second end 1114 to define a media length L along a longitudinal axis x. The filter media assembly 1110 defines a central opening 1116 on an upstream side and an outer radial boundary 1118 along the longitudinal axis x on a downstream side. A first endcap 1120 is coupled to the first end 1112 of the filter media assembly 1110 and a second endcap 1130 is coupled to the second end 1114 of the filter media assembly 1110 such that the filter media assembly 1110 extends between the first endcap 1120 and the second endcap 1130 in the longitudinal direction. The first endcap 1120 has an outer circumferential sealing surface 1122 about the longitudinal axis x and a shroud 1128 that extends longitudinally from the outer circumferential sealing surface 1122 towards the second end 1114 of the filter media assembly 1110.

The filter media assembly 1110 is generally consistent with the description of the filter media assemblies described above. The second endcap 1130 is generally consistent with the description of the second endcap described above. Also, as is visible in FIG. 14, the filter element 1100 incorporates a bypass assembly 1155 that is consistent with the description earlier herein. The first endcap 1120 has various similarities to those examples described above, in that the first endcap 1120 is configured to retain the first end 1112 of the filter media assembly 1110 and create a portion of a fluid flow pathway through the filter media assembly 1110. The first endcap 1120 defines an endcap opening 1121 that is in communication with the central opening 1116 of the filter media assembly 1110. The first endcap 1120 has a media potting structure 1123 that is configured to receive the first end 1112 of the filter media assembly 1110. The media potting structure 1123 has a similar configuration to those described above.

The outer circumferential sealing surface 1122 and the shroud 1128 also have a generally similar configuration, functionality, and structure to the corresponding components discussed earlier herein. At least a portion of the media potting structure 1123 defines a portion of the shroud 1128. In particular, an outer tubular flange 1126 of the media potting structure 1123 defines a terminal end 1129 of the shroud 1128. The shroud 1128 extends longitudinally from the outer circumferential sealing surface 1122 towards the second end 1114 of the filter media assembly 1110. In the current example, however, a substantial portion of the shroud 1128 is positioned between the outer circumferential sealing surface 1122 and the media potting structure 1123.

Similar to the example described above, here the first endcap 1120 lacks a breather filter and spacers and the first endcap 1120 has a handle 1125 extending longitudinally outward from the filter media assembly 1110. The handle 1125 can be configured to be manually graspable by a user.

The filter media assembly 1110 of the filter element 1100 is inserted within a fluid tank 1220 (only a portion of which is depicted for clarity), and a filter cover 1150 is coupled to a filter head 1210 via the mating features 1152 which, in the current example, is a screw connection. Similarly, an outer circumferential seal 1127 disposed about the outer circumferential sealing surface 1122 of the first endcap 1120 forms a seal with a corresponding structure of the filter head 1210. The corresponding structure of the filter head 1210 is an inner radial sealing surface 1211, in the current example. One or more conduits 1212 extend from the filter head 1210 and define a fluid flow pathway leading to the central opening 1116 of the filter media assembly 1110 via the first endcap 1120.

In the current example, a breather filter 1270 is integral to the filter head 1210. The breather filter 1270 can be consistent with other breather filters described herein. The filter head 1210 has a breather filter housing 1290 that receives the breather filter 1270. The breather filter 1270 defines a first flow face 1272, a second flow face 1274, and a central opening 1276.

An airflow pathway 1295 is defined by the filtration system 1200. Here the filter element 1100 alone does not define particular segments of the airflow pathway 1295. The airflow pathway 1295 has a first segment 1295*a* and a second segment 1295*b* defined by the filtration system 1200 components. While the first segment 1295*a* can be considered tortuous, here the second segment 1295*b* is not necessarily tortuous. The filter head 1210 defines the second segment 1295*b* of the airflow pathway, and the first segment 1295*a* of the airflow pathway 1295 is mutually defined by the filter head 1210 and the tank 1220. The first segment 1295*a* extends from the tank 1220 to the first flow face 1272 of the breather filter 1270 and the second segment 1295*b* extends from the second flow face 1274 of the breather filter 1270 to the ambient environment. As such, the first segment 1295*a* and the second segment 1295*b* are in communication through the breather filter 1270.

A terminus 1222 of the airflow pathway 1295 is defined by the tank 1220. In particular, the terminus 1222 of the airflow pathway 1295 can be defined by the interface between the tank 1220 and the filter head 1210, in some embodiments. At least a portion of the shroud 1128 is longitudinally aligned with the terminus 1222. The shroud 1128 is positioned between the terminus 1222 and the filter media assembly 1110. The shroud 1128 is configured to extend longitudinally from the terminus 1222 of the airflow pathway 1295 towards the second end 1114 of the filter media assembly 1110. The length of the shroud is extending past the terminus 1222 towards the second end 1114 of the filter media assembly 1110 can be at least 1 inch (2.56 cm).

While the filter element 1100 is depicted in a filtration system 1200 lacking a separator assembly (such as discussed with references to FIGS. 5, 6*a*-6*c*, and 11), in some embodiments the filter element 1100 can be incorporated in a system with a separator assembly.

FIG. 15 is a facing view of yet another example filter element 1300 consistent with the technology disclosed herein and FIG. 16 is a cross-sectional view of the example filter element 1300 installed in an example filtration system 1400 consistent with example implementations. The filter element 1300 has filter media assembly 1310 extending between a first end 1312 and a second end 1314 to define a media length L along a longitudinal axis x. A separator assembly 1500 extends around the filter element 1300.

The filter media assembly 1310 defines a central opening 1316 on an upstream side and an outer radial boundary 1318 (particularly visible in FIG. 16) along the longitudinal axis x on a downstream side. A first endcap 1320 is coupled to the first end 1312 of the filter media assembly 1310 and a second endcap 1330 is coupled to the second end 1314 of the filter media assembly 1310 such that the filter media assembly 1310 extends between the first endcap 1320 and the second endcap 1330 in the longitudinal direction. The first endcap 1320 has an outer circumferential sealing surface 1322 about the longitudinal axis x and a shroud 1328 that extends longitudinally from the outer circumferential sealing surface 1322 towards the second end 1314 of the filter media assembly 1310. The outer circumferential sealing surface 1322 receives an outer circumferential seal 1327.

The filter media assembly 1310 is generally consistent with the description of the filter media assemblies described above. The second endcap 1330 is generally consistent with the description of the second endcap described above. Also, as is visible in FIG. 16, the filter element 1300 incorporates a bypass assembly 1355 that is consistent with the description earlier herein. The first endcap 1320 has various similarities to those examples described above, in that the first endcap 1320 is configured to retain the first end 1312 of the filter media assembly 1310 and create a portion of a fluid flow pathway through the filter media assembly 1310. The first endcap 1320 defines an endcap opening 1321 that is in communication with the central opening 1316 of the filter media assembly 1310. As is best visible in FIG. 16, the first endcap 1320 has a media potting structure 1323 that is configured to receive the first end 1312 of the filter media assembly 1310. The media potting structure 1323 has a similar configuration to those described above.

The outer circumferential sealing surface 1322 and the shroud 1328 can have a similar configuration, functionality, and structure to the corresponding components discussed earlier herein, except as otherwise described here with specific reference to FIGS. 15 and 16. At least a portion of the media potting structure 1323 defines a portion of the shroud 1328 and the shroud 1328 extends longitudinally from the media potting structure 1323 towards the second end 1314 of the filter media assembly 1310. The shroud 1328 also extends longitudinally from the outer circumferential sealing surface 1322 towards the second end 1314 of the filter media assembly 1310. In the current example, the shroud 1328 is tapered such that its length varies about the outer radial boundary of the filter media assembly 1310. The media potting structure 1323 is positioned between the outer circumferential sealing surface 1322 and a terminal end 1329 of the shroud 1328. A portion of the shroud 1328 is positioned between the media potting structure 1323 and the outer circumferential sealing surface 1322.

Similar to the example described above with reference to FIGS. 8-10, here the first endcap 1320 lacks a breather filter and spacers and the first endcap 1320 has a handle 1325 extending longitudinally outward from the filter media assembly 1310. The handle 1325 can be configured to be manually graspable by a user.

The filter media assembly 1310 of the filter element 1300 is inserted within a fluid tank 1420 (only a portion of which is depicted for clarity), and a filter cover 1350 is coupled to a filter head 1410 via the mating features 1352 which, in the current example, is a screw connection. Similarly, the outer circumferential seal 1327 disposed about the first endcap 1320 forms a seal with a corresponding structure of the filter head 1410. The corresponding structure of the filter head 1410 is an inner radial sealing surface 1411, in the current example. One or more conduits 1412 extend from the filter head 1410 and define a fluid flow pathway leading to the central opening 1316 of the filter media assembly 1310 via the first endcap 1320.

The filtration system 1400 can define an airflow pathway that is consistent with other airflow pathways described herein above, such as the airflow pathway described above with reference to FIG. 11. The terminus 1422 of the airflow pathway can be defined by one or more of a fluid tank, the filter head 1410, the separator assembly 1500 and the filter element 1300. The breather filter (not currently visible) is configured to be in fluid communication with the airflow pathway. In the current example, a breather filter is integral to the filter head 1410. The breather filter can be consistent with other breather filters described herein. The filter head 1410 has a breather filter housing 1490 that receives the breather filter. Similar to previous embodiments described, the breather filter can define a first flow face, a second flow face, and a central opening.

At least a portion of the shroud 1328 is longitudinally aligned with the terminus 1422. At least a portion of the shroud 1328 is radially aligned with the terminus 1422. The shroud 1328 is positioned between the terminus 1422 and the filter media assembly 1310. In some implementations consistent with this example, a first section 1328a of the shroud 1328 that is configured to be radially aligned with a terminus 1422 of an airflow pathway is longer than a second section of the shroud 1328b that is configured to be remote (that is, not radially aligned with the terminus 1422) from the terminus 1422 of an airflow pathway. The shroud 1328 is configured to extend longitudinally from the terminus 1422 of the airflow pathway (not specifically depicted but can be consistent with those airflow pathways previously described) towards the second end 1314 of the filter media assembly 1310 by a particular distance. The length of the first section 1328a of the shroud 1328 that is radially aligned with the terminus 1422 can extend past the terminus 1422 towards the second end 1314 of the filter media assembly 1310 by at least 1 inch (2.56 cm).

In embodiments consistent with the current example, the first endcap 1320 and the filter head 1410 mutually define an alignment feature 1326 that is configured to radially align the terminus 1422 of the airflow pathway with the first section 1328a of the shroud 1328 when the filter element 1300 is installed on the filter head 1410. The alignment feature 1326 can be a key 1326a extending from the first endcap 1320 and a keyway (not currently visible) defined by the filter head 1410. In some embodiments the alignment feature can be a key extending from the filter head and a keyway defined by the first endcap. Other configurations are certainly possible.

The separator assembly 1500 is generally consistent with separator assemblies already discussed herein. The separator assembly 1500 is configured impede the passage of liquid into the airflow pathway defined by the filtration system 1400, particularly at the terminus 1422 of the airflow pathway. The separator assembly 1500 has a first separator endcap 1520 and separator material 1510 extending from the first separator endcap 1520 along the longitudinal axis x. The first separator endcap 1520 is coupled to a first longitudinal end 1502 of the separator material 1510. The separator assembly 1500 defines a cavity 1506 that is configured to substantially receive the filter element 1300.

The separator endcap 1520 has a radial rim 1521 on one longitudinal end and a radial separator potting structure 1522 on an opposite longitudinal end. The radial separator potting structure 1522 forms a receiving channel that is configured to receive a first end 1502 of the separator material 1510, as discussed above. The first separator endcap 1520 partially defines a portion of the cavity 1506 extending between the two longitudinal ends of the first separator endcap 1520. The cavity 1506 is configured to accommodate the filter element 1300.

The first separator endcap 1520 defines an inner circumferential seal surface 1523 that is configured to form a fluid seal with the shroud 1328 of the filter element 1300. The inner circumferential seal surface 1523 projects radially into the cavity 1506. When uninstalled in a system, the inner circumferential seal surface 1523 has a radius that is less than a corresponding radius of an outer surface of the shroud 1328. Upon installation in the filtration system 1400, the inner circumferential seal surface 1523 is configured to flex radially outward to have a radius equal to the radius of the outer surface of the shroud 1328. In various embodiments, the inner circumferential seal surface 1523 is configured to contact the outer surface of the shroud 1328 between the outer circumferential sealing surface 1322 of the first endcap 1320 and the terminal end 1329 of the shroud 1328. The inner circumferential seal surface 1523 can be constructed consistently with inner circumferential seal surfaces discussed herein above.

In the current example, the inner circumferential seal surface 1523 has a length that varies about its circumference, where the length can be measured from the radial rim 1521 of the first separator endcap 1520. In particular, the inner circumferential seal surface 1523 is configured to be positioned adjacently to the terminal end of the 1329 of the shroud 1328 about the circumference of the shroud 1328. In some alternate examples, the inner circumferential seal surface 1523 has a constant length from the radial rim 1521 about its circumference. In some embodiments, such as embodiments where the separator assembly can define a radial alignment feature (not currently visible) that is configured to radially align the separator assembly 1500 and the filter element 1300. In various embodiments the separator assembly can define a radial alignment feature (not currently visible) that is configured to radially align the separator assembly 1500 and the filter head 1410.

The first separator endcap 1520 and the first endcap 1320 of the filter element 1300 generally define an air gap 1526 therebetween. The air gap 1526 is defined from the inner circumferential sealing surface 1523 towards the outer circumferential sealing surface 1322 of the first endcap 1320.

In particular, the air gap 1526 is extends longitudinally from the inner circumferential sealing surface 1523 to the filter head 1410 about the filter element 1300. The air gap 1526 is in fluid communication with the terminus 1422 of the airflow pathway. Similar to as described earlier herein, an air channel opening 1524 extends through the first separator endcap 1520 to be in fluid communication with the air gap 1526. The air channel opening 1524 is defined between the radial rim 1521 and the inner circumferential seal surface 1523 of the first separator endcap 1520 relative to the longitudinal direction. As such, the air channel opening 1524 is in direct fluid communication with the air gap 1526. The air channel opening 1524 is generally configured to facilitate airflow between the tank 1420 and the airflow pathway. In this example there can be a single air channel opening 1524.

As discussed above in detail, the separator assembly 1500 has the separator material 1510 extending longitudinally from the first separator endcap 1520. The separator material 1510 mutually defines the cavity 1506 extending along the longitudinal axis x. In various embodiments, the portion of the cavity 1506 defined by the separator material 1510 is generally cylindrical. In various embodiments, the separator assembly 1500 and the filter element 1300 mutually define a fluid gap 1508 therebetween. The fluid gap 1508 receives aerated filtered liquid from the filter element 1300 and provides the opportunity for gases in the liquid to nucleate (causing the liquid to de-aerate) before passing through the separator assembly 1500 into the tank 1420.

The separator material 1510 has separator media 1514 disposed about the longitudinal axis x. The separator media 1514 is generally configured to facilitate the deaeration of the filtered liquid. In various embodiments, the separator media 1514 has a higher permeability than the filter media 1311 of the filter assembly 1310. In some embodiments, the separator media 1514 does not have a filtration efficiency, and in some other embodiments, the separator media 1514 has a lower filtration efficiency than the filter media 1311. In some embodiments incorporating the bypass assembly 1355, the separator media 1514 can have an efficiency sufficient to meet minimum filtration requirements for the bypass fluid. The separator media 1514 can be consistent with separator medias discussed earlier herein. The separator material 1510 can also have a structural support layer 1512 similar to that described earlier herein.

The separator assembly 1500 also has a second separator endcap 1530 coupled to a second longitudinal end 1504 of the separator material 1510. The second separator endcap 1530 can be consistent with those already described herein.

While the filter element 1300 is depicted in a filtration system 1400 having a separator assembly 1500, in some embodiments the filter element 1300 can be incorporated in a system without a separator assembly, such as that described with reference to FIG. 13.

Exemplary Embodiments

Embodiment 1. A filter element comprising:
filter media assembly extending between a first end and a second end to define a media length along a longitudinal axis, wherein the filter media assembly defines a central opening on an upstream side and an outer radial boundary about the longitudinal axis on a downstream side;
a first endcap coupled to the first end, the first endcap comprising:
a media potting structure defining: an annular surface abutting the first end of the filter media assembly, an inner tubular flange extending longitudinally from the annular surface into the central opening, and an outer tubular flange extending longitudinally from the annular surface over the outer radial boundary of the first end of the filter media assembly,
an outer circumferential sealing surface about the longitudinal axis, and a shroud extending longitudinally from the outer circumferential sealing surface towards the second end, wherein the shroud is configured to obstruct fluid flow.

Embodiment 2. A filter element of any one of embodiments 1 and 3-20, wherein the shroud surrounds the outer radial boundary of the filter media assembly.

Embodiment 3. A filter element of any one of embodiments 1-2 and 4-20, wherein the shroud has a length that is no more than ¼ of the media length.

Embodiment 4. A filter element of any one of embodiments 1-3 and 5-20, wherein the shroud has a length that varies about the outer radial boundary of the filter media assembly.

Embodiment 5. A filter element of any one of embodiments 1-4 and 6-20, wherein a substantial portion of the shroud is between the outer circumferential sealing surface and the media potting structure.

Embodiment 6. A filter element of any one of embodiments 1-5 and 7-20, wherein the minimum radial distance between the outer radial boundary and the shroud is at least 1 mm.

Embodiment 7. A filter element of any one of embodiments 1-6 and 8-20, wherein the shroud has a length greater than or equal to 1 inch.

Embodiment 8. A filter element of any one of embodiments 1-7 and 9-20, wherein the shroud extends longitudinally from the media potting structure towards the second end of the filter media assembly.

Embodiment 9. A filter element of any one of embodiments 1-8 and 10-20, wherein the outer circumferential sealing surface is between the media potting structure and a terminal end of the shroud.

Embodiment 10. A filter element of any one of embodiments 1-9 and 11-20, wherein the shroud extends circumferentially about the longitudinal axis.

Embodiment 11. A filter element of any one of embodiments 1-10 and 12-20, wherein a portion of the media potting structure defines a portion of the shroud.

Embodiment 12. A filter element of any one of embodiments 1-11 and 13-20, further comprising:
a breather filter housing coupled to the first endcap;
a filter cover coupled to the first endcap, wherein the breather filter housing and the filter cover mutually define a breather filter cavity; and
a breather filter disposed in the breather filter cavity, wherein the breather filter defines a first flow face and a second flow face, and wherein the first endcap defines a first tortuous airflow pathway between an ambient environment and the first flow face, and the filter cover defines a second tortuous airflow pathway between the ambient environment and the second flow face.

Embodiment 13. A filter element of any one of embodiments 1-12 and 14-20, wherein the filter cover defines a fill port that is central to the filter cover.

Embodiment 14. A filter element of any one of embodiments 1-13 and 15-20, wherein the fill port extends in a longitudinal direction.

Embodiment 15. A filter element of any one of embodiments 1-14 and 16-20, wherein the breather filter comprises a desiccant.

Embodiment 16. A filter element of any one of embodiments 1-15 and 17-20, wherein the breather filter comprises a regenerative hygroscopic filter.

Embodiment 17. A filter element of any one of embodiments 1-16 and 18-20, the breather filter housing comprising a main portion and an airflow channel plate, wherein the main portion and the airflow channel plate mutually define the first tortuous airflow pathway.

Embodiment 18. A filter element of any one of embodiments 1-17 and 19-20, further comprising a plurality of spacers extending between the first endcap and the breather filter housing.

Embodiment 19. A filter element of any one of embodiments 1-18 and 20, wherein the second flow face of the breather filter is an outer radial flow face and the first flow face of the breather filter is an inner radial flow face; and wherein the breather filter and the filter media assembly share a central axis.

Embodiment 20. A filter element of any one of embodiments 1-19, wherein the filter media assembly has filter media that is pleated.

Embodiment 21. A filtration system comprising:
a filter element comprising:
  a filter media assembly extending between a first end and a second end to define a media length along a longitudinal axis, wherein the filter media assembly defines a central opening on an upstream side and an outer radial boundary about the longitudinal axis on a downstream side;
  a first endcap coupled to the first end, the first endcap comprising: a media potting structure defining: an annular surface abutting the first end of the filter media assembly, an inner tubular flange extending longitudinally from the annular surface into the central opening, and an outer tubular flange extending longitudinally from the annular surface over the outer radial boundary of the filter media assembly,
a shroud extending longitudinally from the media potting structure, wherein the shroud defines a terminal end between the first end of the filter media assembly and the second end of the filter media assembly; and
a separator assembly defining a cavity comprising:
a first separator endcap having a radial rim on one longitudinal end and a radial separator potting structure on an opposite longitudinal end, where the first separator endcap defines an inner circumferential seal surface and an air channel opening between the radial rim and the radial separator potting structure relative to a longitudinal direction, wherein the inner circumferential seal surface has a radius that is less than a radius of an outer surface of a corresponding portion of the shroud, whereby the first separator endcap and the corresponding portion of the shroud are configured to form a seal, and
separator material extending from the radial separator potting structure along the longitudinal axis, wherein the cavity is configured to substantially receive the filter element.

Embodiment 22. A filtration system of any one of embodiments 21 and 23-45, wherein the separator material comprises pleated wire mesh.

Embodiment 23. A filtration system of any one of embodiments 21-22 and 24-45, wherein the separator material comprises a stainless steel wire mesh.

Embodiment 24. A filtration system of any one of embodiments 21-23 and 25-45, wherein the wire of the wire mesh defines openings having a width of about 50 microns.

Embodiment 25. A filtration system of any one of embodiments 21-24 and 26-45, wherein the separator material comprises a first layer of wire mesh and a second layer of wire mesh.

Embodiment 26. A filtration system of any one of embodiments 21-25 and 27-45, wherein the separator material comprises at least one material in the group consisting of: micro-glass, cellulose, and a polymer.

Embodiment 27. A filtration system of any one of embodiments 21-26 and 28-45, the first endcap defining an outer circumferential sealing surface about the longitudinal axis.

Embodiment 28. A filtration system of any one of embodiments 21-27 and 29-45, wherein the shroud surrounds the outer radial boundary of the filter media assembly.

Embodiment 29. A filtration system of any one of embodiments 21-28 and 30-45, wherein the shroud has a length that is no more than ¼ of the media length.

Embodiment 30. A filtration system of any one of embodiments 21-29 and 31-45, the shroud has a length that varies about the outer radial boundary of the filter media assembly.

Embodiment 31. A filtration system of any one of embodiments 21-30 and 32-45, wherein the first endcap defines an outer circumferential sealing surface, and a substantial portion of the shroud is between the outer circumferential sealing surface and the media potting structure.

Embodiment 32. A filtration system of any one of embodiments 21-31 and 33-45, wherein the minimum radial distance between the outer radial boundary and the shroud is at least 1 mm.

Embodiment 33. A filtration system of any one of embodiments 21-32 and 34-45, wherein the shroud has a length greater than or equal to 1 inch.

Embodiment 34. A filtration system of any one of embodiments 21-33 and 35-45, wherein the shroud extends longitudinally from the media potting structure towards the second end of the filter media assembly.

Embodiment 35. A filtration system of any one of embodiments 21-34 and 36-45, wherein the first endcap defines an outer circumferential sealing surface, and wherein the outer circumferential sealing surface is between the media potting structure and a terminal end of the shroud.

Embodiment 36. A filtration system of any one of embodiments 21-35 and 37-45, wherein a portion of the media potting structure defines a portion of the shroud.

Embodiment 37. A filtration system of any one of embodiments 21-36 and 38-45, wherein the filter element further comprises:
a breather filter housing coupled to the first endcap;
  a filter cover coupled to the first endcap, wherein the breather filter housing and the filter cover mutually define a breather filter cavity; and
  a breather filter disposed in the breather filter cavity, wherein the breather filter defines a first flow face and a second flow face, and wherein the first endcap defines a first tortuous airflow pathway between an ambient environment and the first flow face, and the filter cover defines a second tortuous airflow pathway between the ambient environment and the second flow face.

Embodiment 38. A filter element of any one of embodiments 21-37 and 39-45, wherein the filter cover defines a fill port that is central to the filter cover.

Embodiment 39. A filter element of any one of embodiments 21-38 and 40-45, wherein the fill port extends in a longitudinal direction.

Embodiment 40. A filter element of any one of embodiments 21-39 and 41-45, wherein the breather filter comprises a desiccant.

Embodiment 41. A filter element of any one of embodiments 21-40 and 42-45, wherein the breather filter comprises a regenerative hygroscopic filter.

Embodiment 42. A filter element of any one of embodiments 21-41 and 43-45, the breather filter housing comprising a main portion and an airflow channel plate, wherein the main portion and the airflow channel plate mutually define the first tortuous airflow pathway.

Embodiment 43. A filter element of one of any one of embodiments 21-42 and 44-45, further comprising a plurality of spacers extending between the first endcap and the breather filter housing.

Embodiment 44. A filter element of one of any one of embodiments 21-43 and 45, wherein the second flow face of the breather filter is an outer radial flow face and the first flow face of the breather filter is an inner radial flow face; and wherein the breather filter and the filter media assembly share a central axis.

Embodiment 45. A filter element of any one of embodiments 21-44, wherein the filter media assembly has filter media that is pleated.

Embodiment 46. A filtration system comprising:
a fluid tank defining an opening;
a filter element at least partially disposed in the fluid tank through the opening, the filter element defining a central opening and comprising a first endcap and a filter media assembly extending longitudinally from the first endcap to a second end,
wherein the first endcap comprises a shroud extending longitudinally from the first endcap over an outer radial boundary of the filter media assembly;
a filter head coupled to the fluid tank and the first endcap, wherein the filter head defines one or more conduits in fluid communication with the central opening of the filter element; and
a filter cover coupled to the filter head,
wherein the filtration system is configured to cumulatively define an airflow pathway extending from a terminus to an ambient environment, wherein the terminus is in direct fluid communication with an interior of the fluid tank, wherein at least a portion of the shroud is configured to be positioned between the terminus and the filter media assembly, and wherein the shroud extends from the terminus towards the second end of the filter media assembly.

Embodiment 47. A filtration system of any one of embodiments 46 and 48-58, further comprising a breather filter disposed in the airflow pathway.

Embodiment 48. A filtration system of any one of embodiments 46-47 and 49-58, wherein the first endcap has an outer circumferential sealing surface and a media potting structure, and a substantial portion of the shroud extends between the outer circumferential sealing surface and the media potting structure.

Embodiment 49. A filtration system of any one of embodiments 46-48 and 50-58, wherein the shroud has a length in the longitudinal direction of at least one inch.

Embodiment 50. A filtration system of any one of embodiments 46-49 and 51-58, wherein the filter media assembly has a media length and the shroud has a length that is no more than ¼ of the media length.

Embodiment 51. A filtration system of any one of embodiments 46-50 and 52-58, wherein the shroud has a length that varies about the outer radial boundary of the filter media assembly.

Embodiment 52. A filtration system of any one of embodiments 46-51 and 53-58, wherein the minimum radial distance between the outer radial boundary and the shroud is at least 1 mm.

Embodiment 53. A filtration system of any one of embodiments 46-52 and 54-58, wherein the shroud has a length greater than or equal to 1 inch.

Embodiment 54. A filtration system of any one of embodiments 46-53 and 55-58, wherein the first endcap has an outer circumferential sealing surface and a media potting structure, wherein the outer circumferential sealing surface is between the media potting structure and a terminal end of the shroud.

Embodiment 55. A filtration system of any one of embodiments 46-54 and 56-58, wherein the shroud extends circumferentially about a longitudinal axis.

Embodiment 56. A filtration system of any one of embodiments 46-55 and 57-58, wherein the first endcap has a media potting structure, wherein a portion of the media potting structure defines a portion of the shroud.

Embodiment 57. A filtration system of any one of embodiments 46-56 and 58, further comprising a separator assembly defining a cavity, the separator assembly comprising a first separator endcap having a radial separator potting structure and separator material extending from the radial separator potting structure along a longitudinal axis, wherein the cavity is configured to substantially receive the filter element.

Embodiment 58. A filtration system of any one of embodiments 46-57, wherein the first separator endcap comprises a radial rim on one longitudinal end and the radial separator potting structure on an opposite longitudinal end, where the first separator endcap defines an inner circumferential seal surface and an air channel opening between the radial rim and the radial separator potting structure relative to a longitudinal direction, wherein the inner circumferential seal surface has a radius that is less than a radius of an outer surface of a corresponding portion of the shroud, whereby the first separator endcap and the corresponding portion of the shroud are configured to form a seal.

It should also be noted that, as used in this specification and the appended claims, the phrase "configured" describes a system, apparatus, or other structure that is constructed to perform a particular task or adopt a particular configuration. The phrase "configured" can be used interchangeably with other similar phrases such as "arranged", "constructed", "manufactured", and the like.

All publications and patent applications in this specification are indicative of the level of ordinary skill in the art to which the present technology pertains. All publications and patent applications are herein incorporated by reference to the same extent as if each individual publication or patent application was specifically and individually indicated by reference.

This application is intended to cover adaptations or variations of the present subject matter. It is to be understood that the above description is intended to be illustrative, and not restrictive.

What is claimed is:
1. A filter element comprising:
filter media assembly extending between a first end and a second end to define a media length along a longitudinal axis, wherein the filter media assembly defines a central opening on an upstream side and an outer radial boundary about the longitudinal axis on a downstream side;

a first endcap coupled to the first end, the first endcap comprising:
 a media potting structure defining: an annular surface abutting the first end of the filter media assembly, an inner tubular flange extending longitudinally from the annular surface into the central opening, and an outer tubular flange extending longitudinally from the annular surface over the outer radial boundary of the first end of the filter media assembly,
 an outer circumferential sealing surface about the longitudinal axis, and
 a shroud extending longitudinally from the outer circumferential sealing surface towards the second end, wherein the shroud is configured to obstruct fluid flow, wherein the shroud has a length greater than or equal to 1 inch from the outer circumferential sealing surface to a terminal end of the shroud.

2. A filter element of claim 1, wherein the shroud surrounds the outer radial boundary of the filter media assembly.

3. A filter element of claim 1, wherein the shroud has a length that is no more than ¼ of the media length.

4. A filter element of claim 1, wherein the shroud has a length that varies about the outer radial boundary of the filter media assembly.

5. A filter element of claim 1, wherein a substantial portion of the shroud is between the outer circumferential sealing surface and the media potting structure.

6. A filter element of claim 1, wherein a minimum radial distance between the outer radial boundary and the shroud is at least 1 mm.

7. A filter element of claim 1, wherein the shroud extends longitudinally from the media potting structure towards the second end of the filter media assembly.

8. A filter element of claim 1, wherein the outer circumferential sealing surface is between the media potting structure and a terminal end of the shroud.

9. A filter element of claim 1, wherein the shroud extends circumferentially about the longitudinal axis.

10. A filter element of claim 1, wherein a portion of the media potting structure defines a portion of the shroud.

11. A filter element of claim 1, further comprising:
 a breather filter housing coupled to the first endcap;
 a filter cover coupled to the first endcap, wherein the breather filter housing and the filter cover mutually define a breather filter cavity; and
 a breather filter disposed in the breather filter cavity, wherein the breather filter defines a first flow face and a second flow face, and wherein the first endcap defines a first tortuous airflow pathway between an ambient environment and the first flow face, and the filter cover defines a second tortuous airflow pathway between the ambient environment and the second flow face.

12. A filter element of claim 11, wherein the filter cover defines a fill port that is central to the filter cover.

13. A filter element of claim 12, wherein the fill port extends in a longitudinal direction.

14. A filter element of claim 11, wherein the breather filter comprises a desiccant.

15. A filter element of claim 11, wherein the breather filter comprises a regenerative hygroscopic filter.

16. A filter element of claim 11, the breather filter housing comprising a main portion and an airflow channel plate, wherein the main portion and the airflow channel plate mutually define the first tortuous airflow pathway.

17. A filter element of claim 11, further comprising a plurality of spacers extending between the first endcap and the breather filter housing.

18. A filter element of claim 11, wherein the second flow face of the breather filter is an outer radial flow face and the first flow face of the breather filter is an inner radial flow face; and wherein the breather filter and the filter media assembly share a central axis.

19. A filtration system comprising:
 a filter element comprising:
  a filter media assembly extending between a first end and a second end to define a media length along a longitudinal axis, wherein the filter media assembly defines a central opening on an upstream side and an outer radial boundary about the longitudinal axis on a downstream side;
  a first endcap coupled to the first end, the first endcap comprising:
 a media potting structure defining: an annular surface abutting the first end of the filter media assembly, an inner tubular flange extending longitudinally from the annular surface into the central opening, and an outer tubular flange extending longitudinally from the annular surface over the outer radial boundary of the filter media assembly, a shroud extending longitudinally from the media potting structure, wherein the shroud defines a terminal end between the first end of the filter media assembly and the second end of the filter media assembly; and
 a separator assembly defining a cavity comprising:
 a first separator endcap having a radial rim on one longitudinal end and a radial separator potting structure on an opposite longitudinal end, where the first separator endcap defines an inner circumferential seal surface and an air channel opening between the radial rim and the radial separator potting structure relative to a longitudinal direction, wherein the inner circumferential seal surface has a radius that is less than a radius of an outer surface of a corresponding portion of the shroud, whereby the first separator endcap and the corresponding portion of the shroud are configured to form a seal, and
 separator material extending from the radial separator potting structure along the longitudinal axis, wherein the cavity is configured to substantially receive the filter element.

* * * * *